March 15, 1960
F. F. LINDSTAEDT
2,928,222
PACKAGING MACHINE
Filed Aug. 4, 1955
12 Sheets-Sheet 7
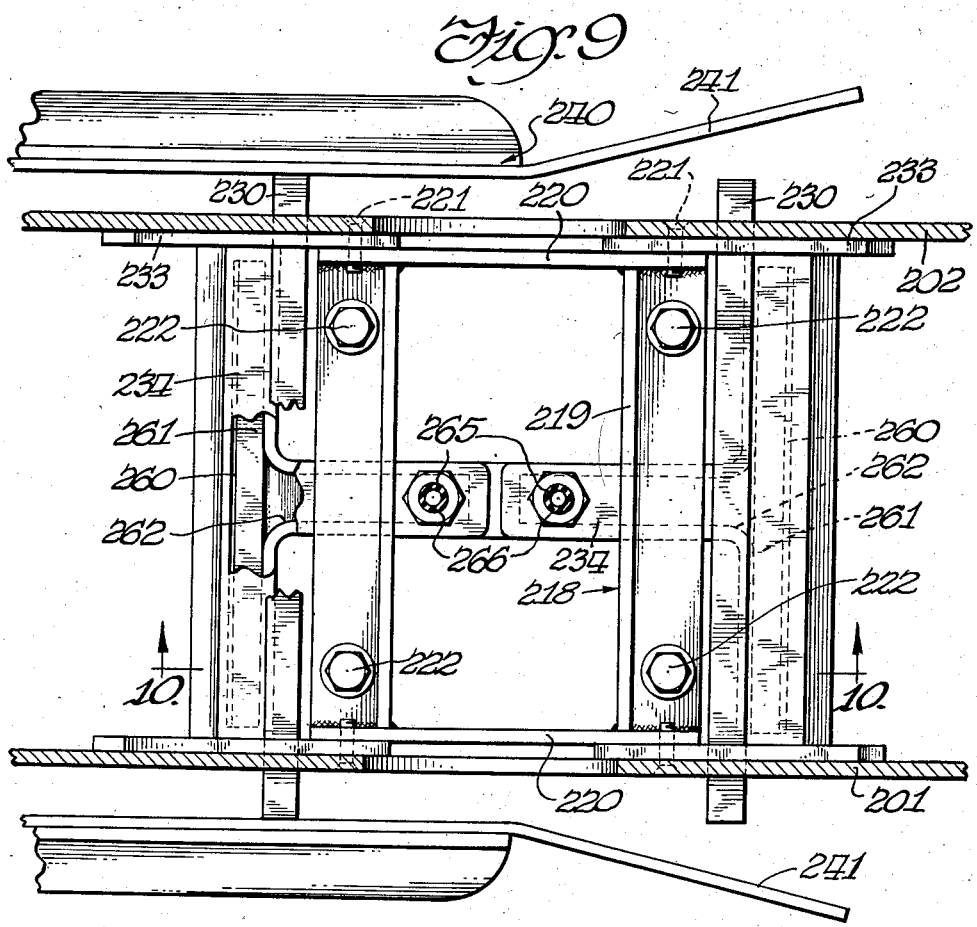
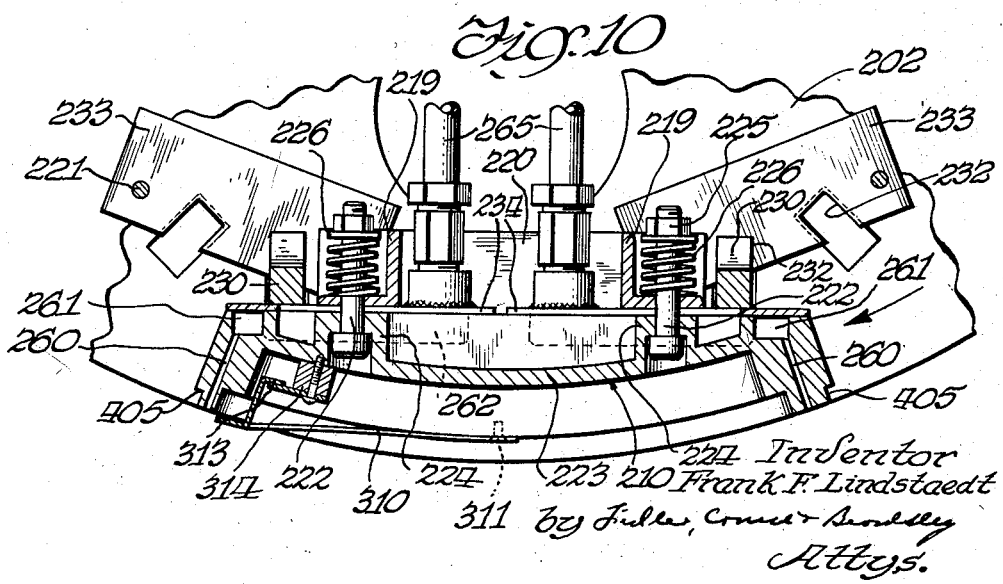
Inventor
Frank F. Lindstaedt
by Fuller, Crouse & Bradley
Attys.

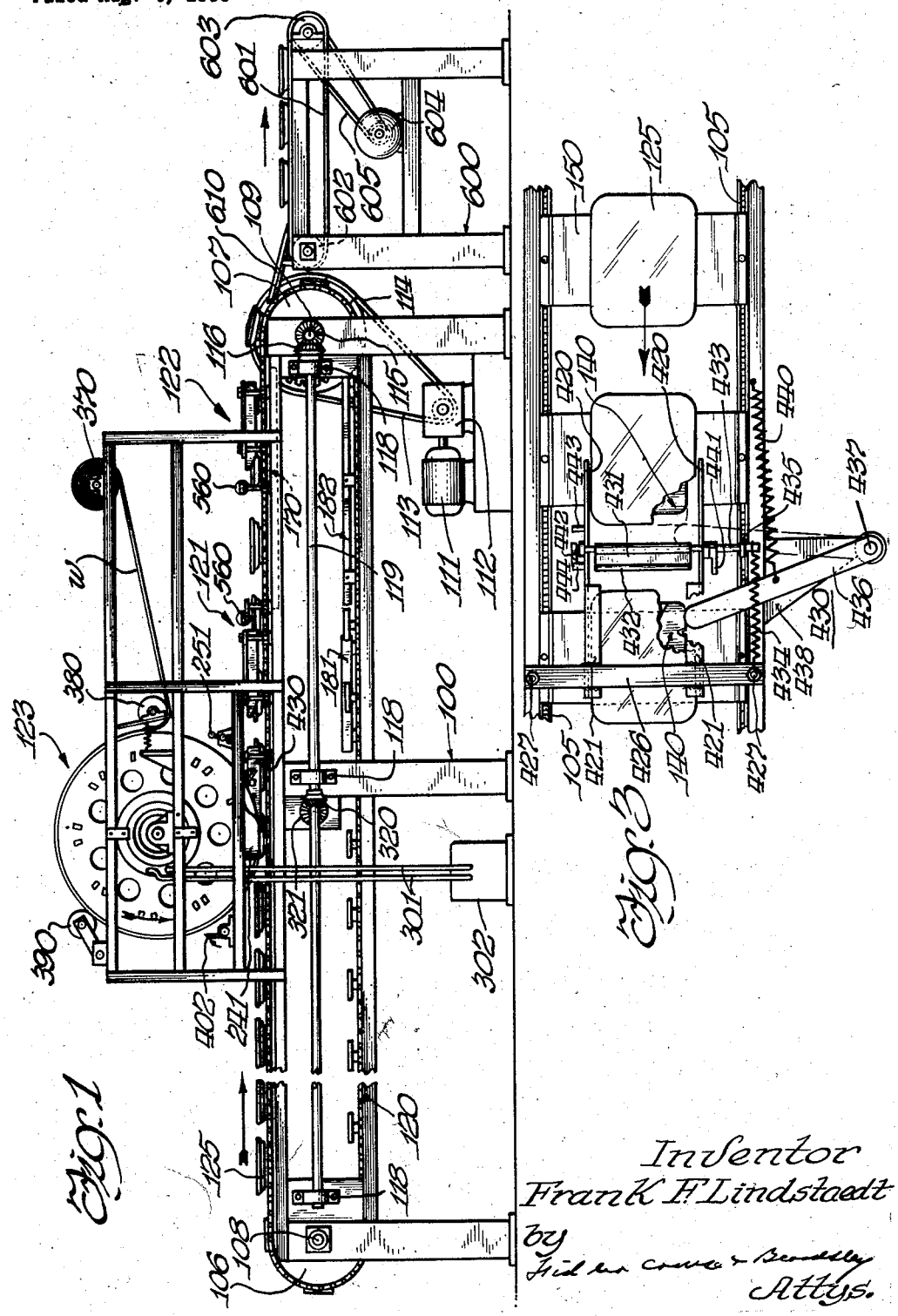

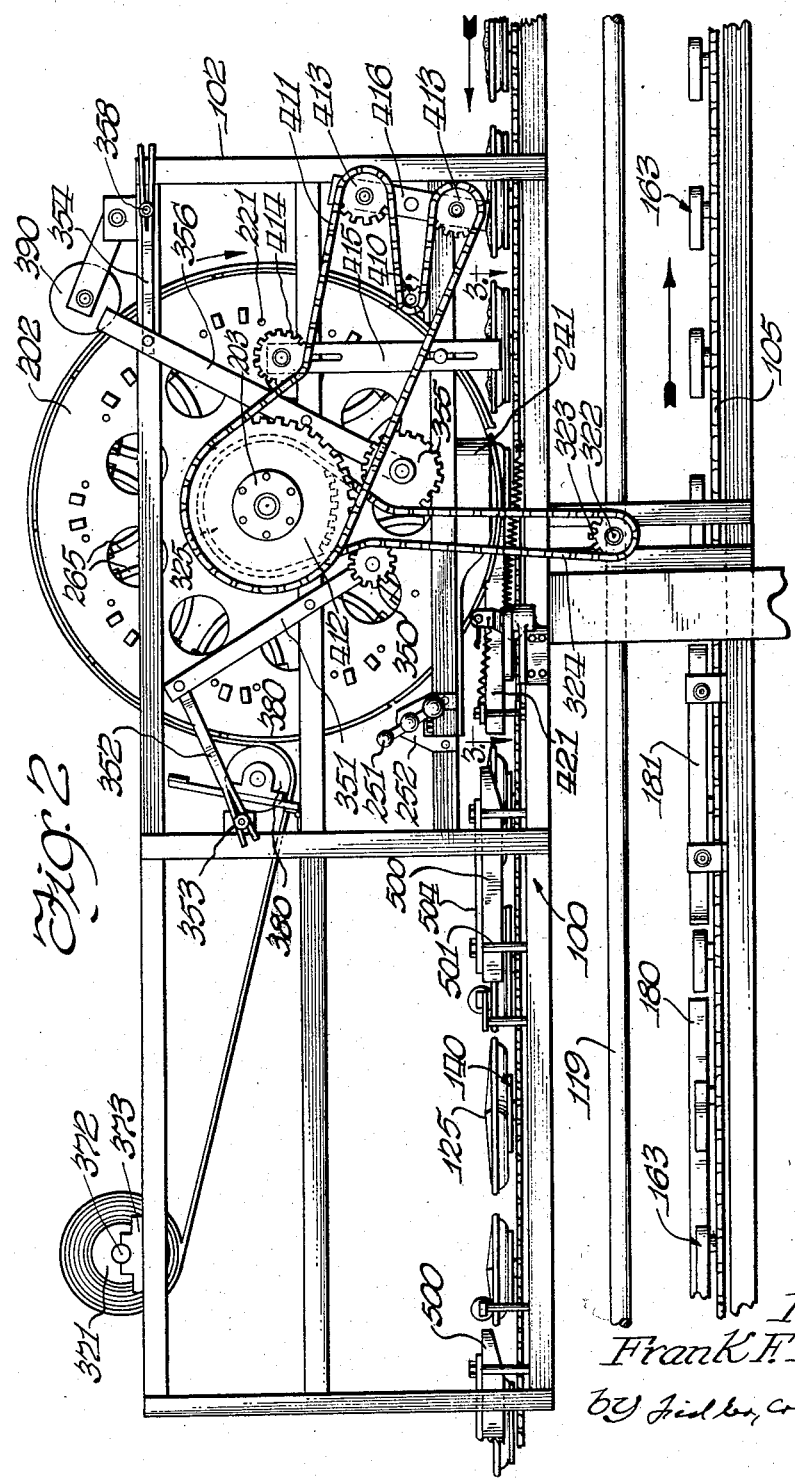

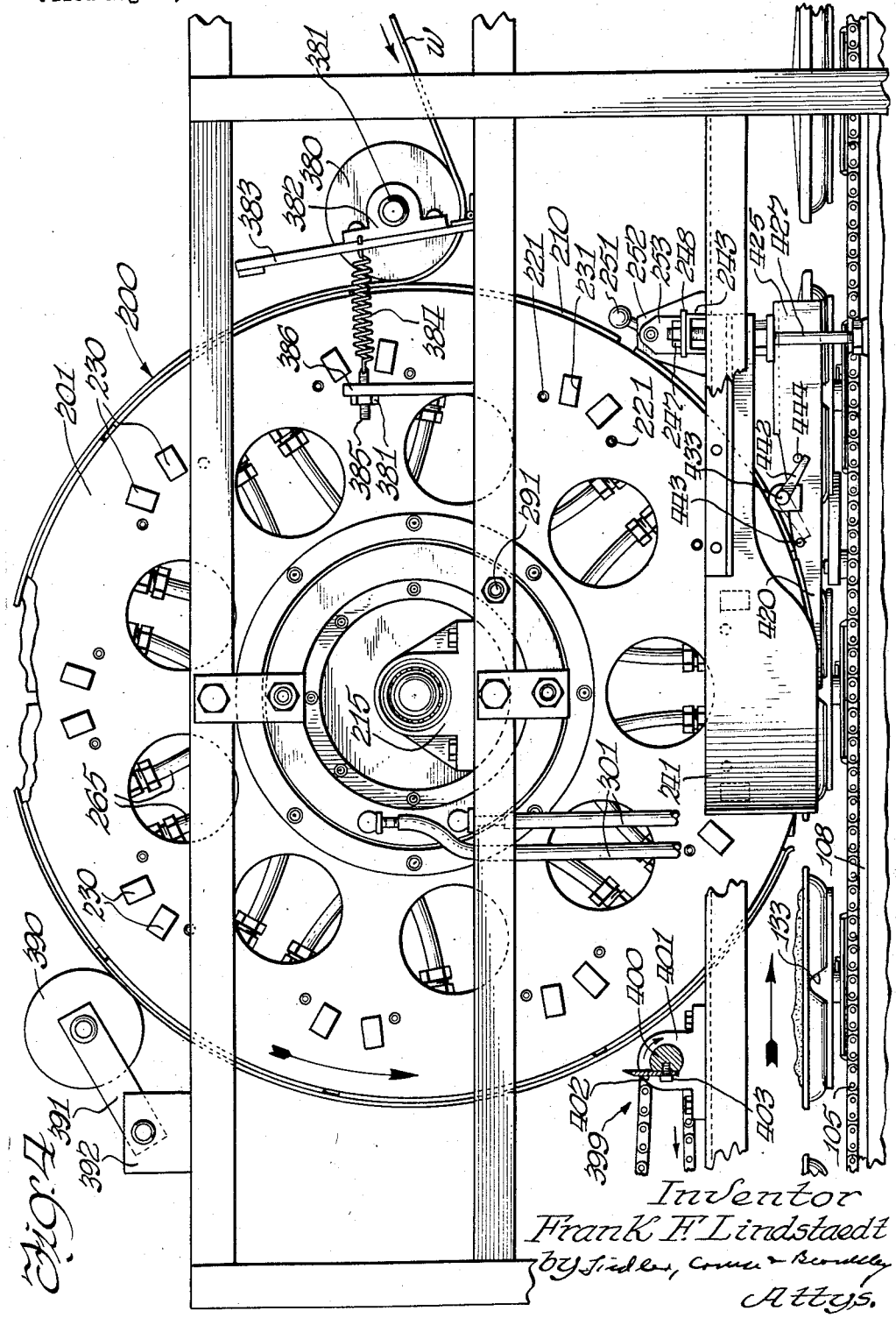

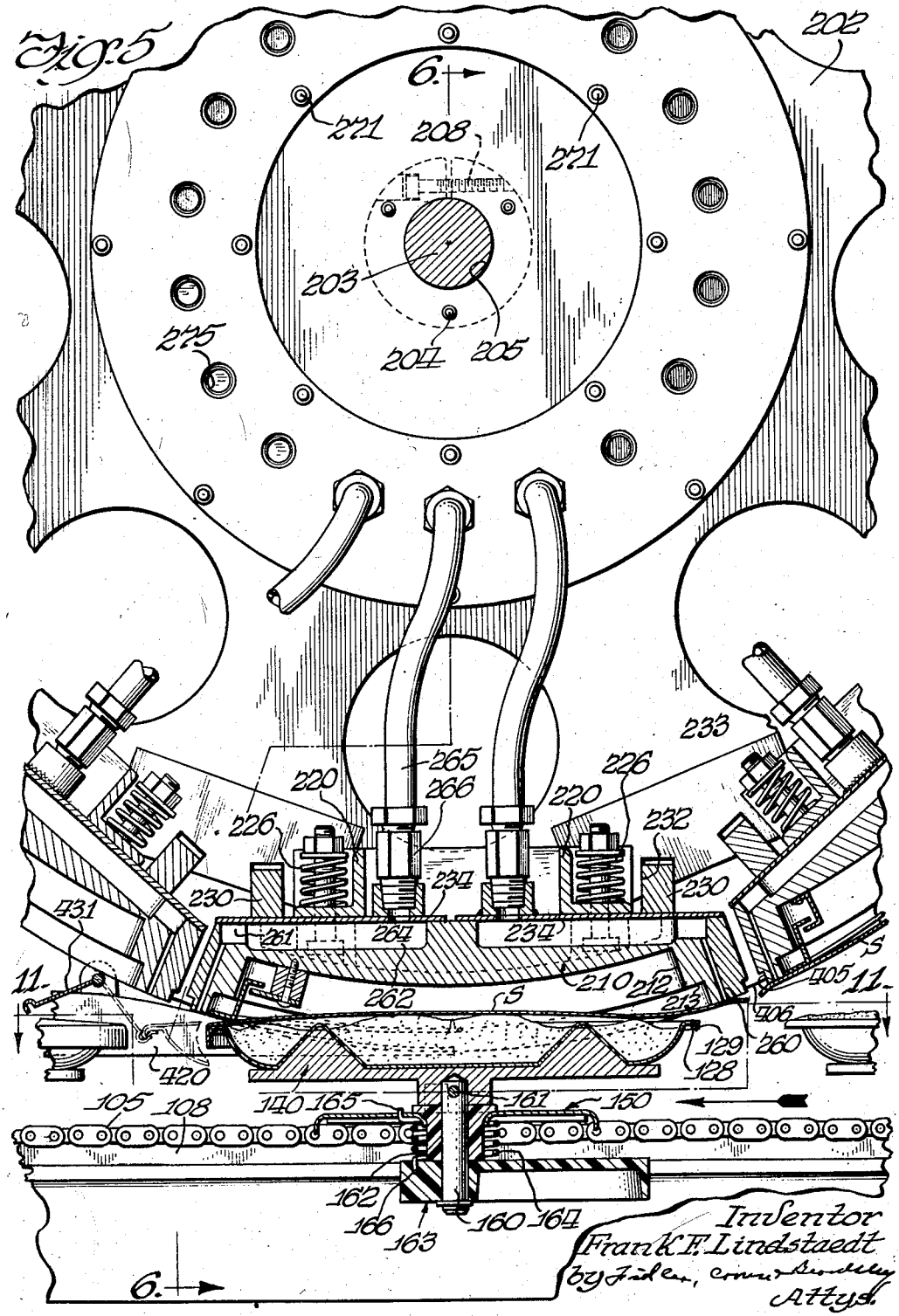

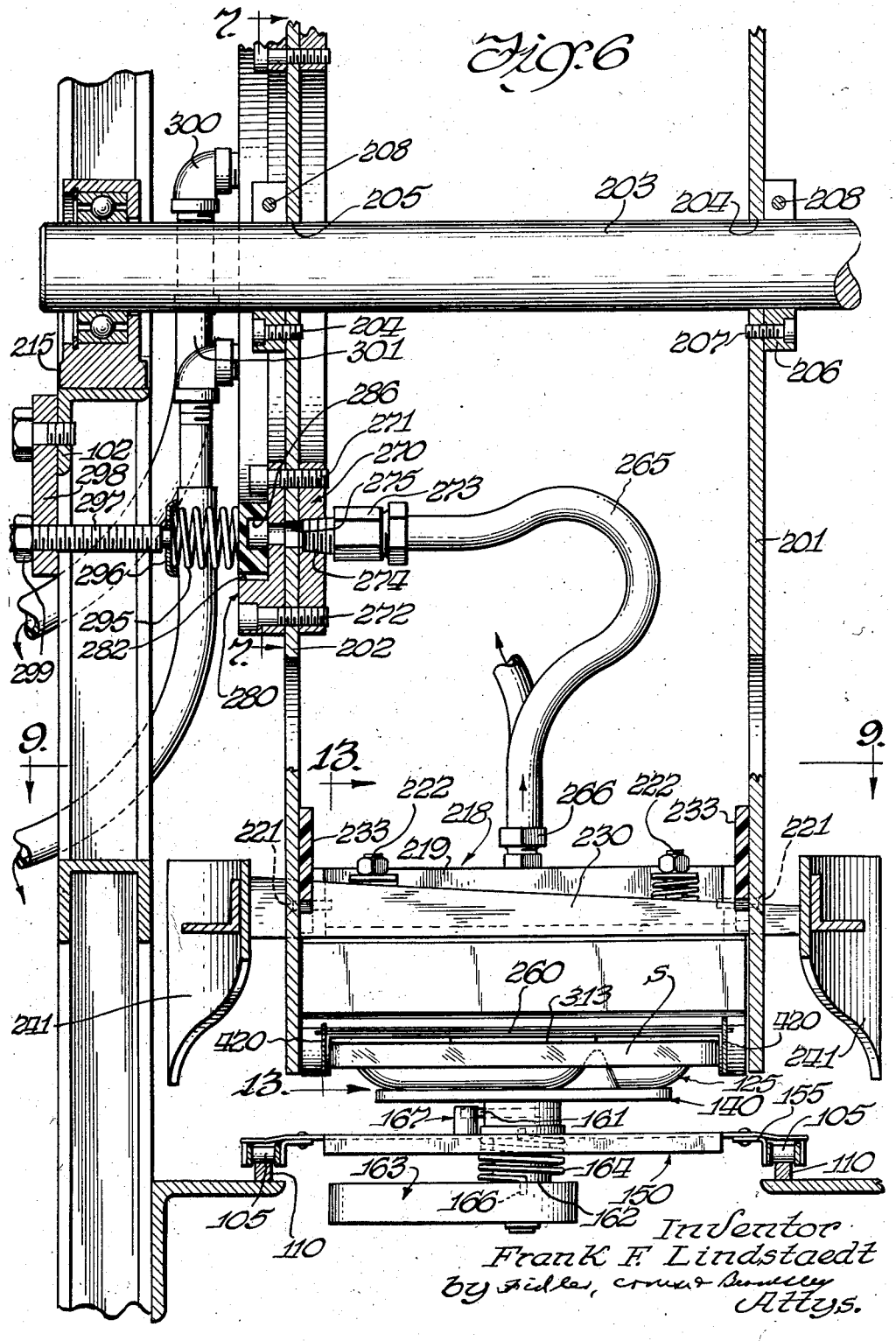

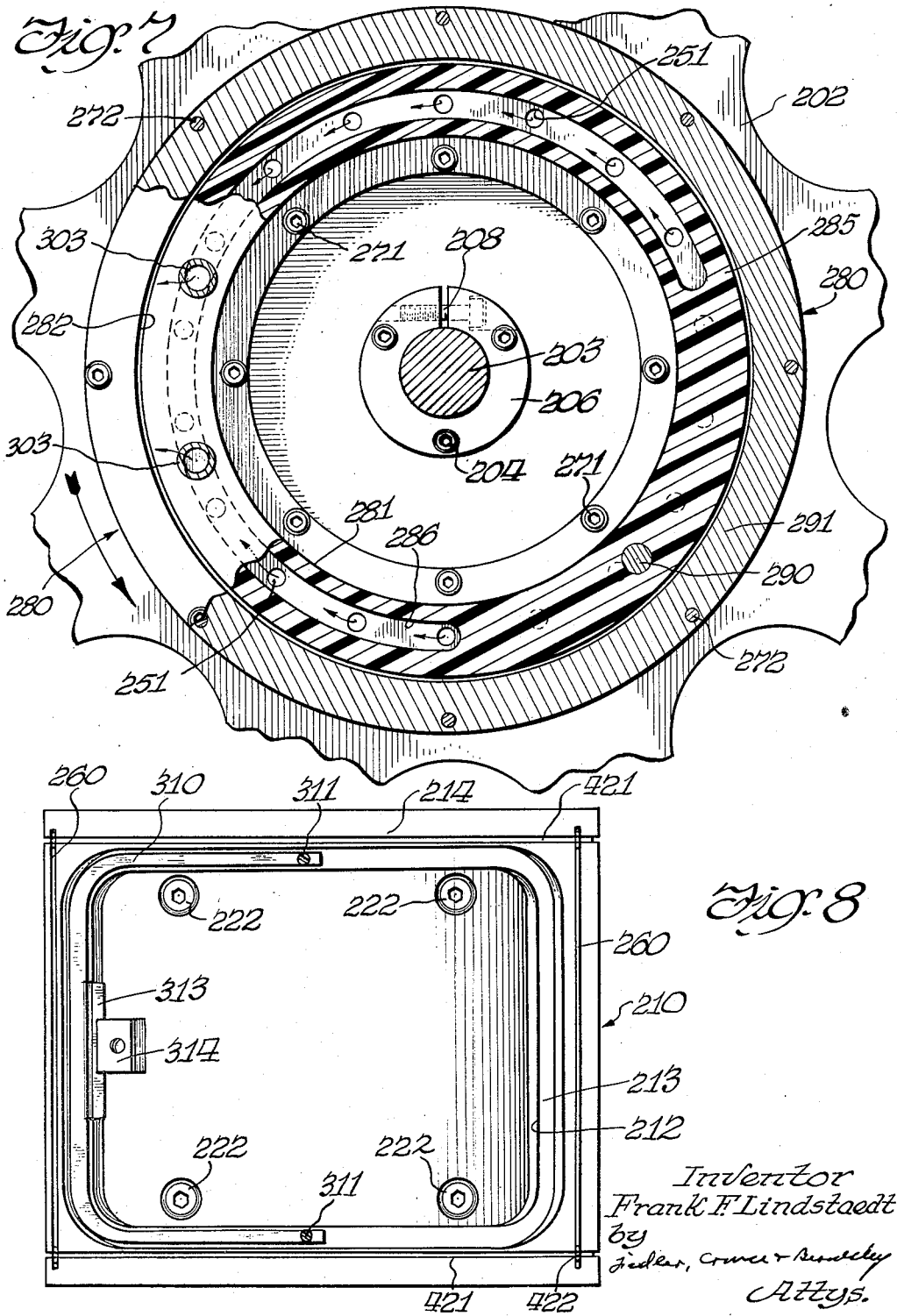

March 15, 1960 F. F. LINDSTAEDT 2,928,222
PACKAGING MACHINE
Filed Aug. 4, 1955 12 Sheets-Sheet 8
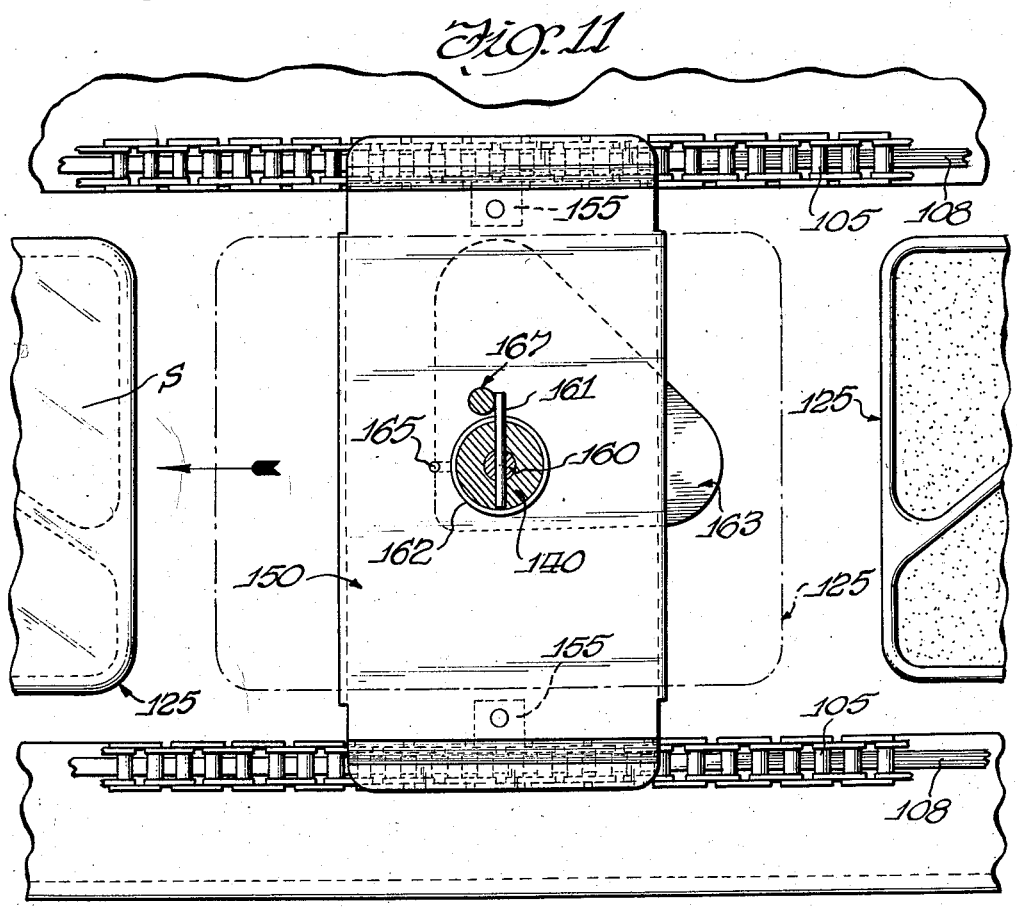
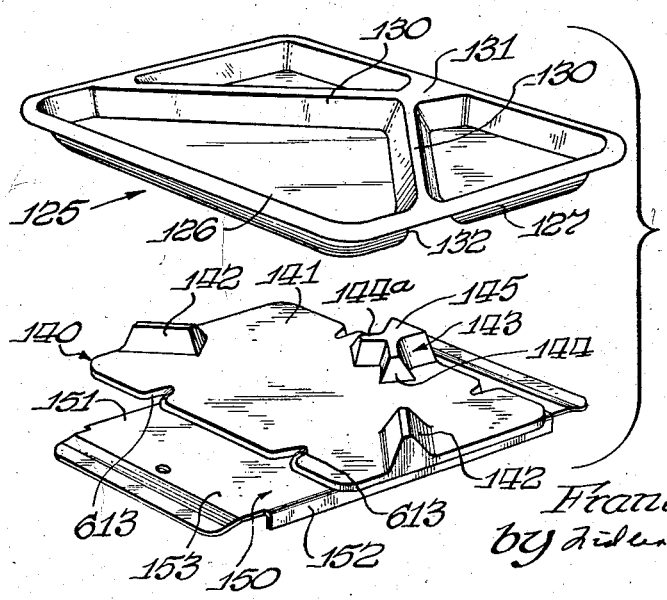
Inventor
Frank F. Lindstaedt
by Zidler, Comer & Buddley
Attorneys

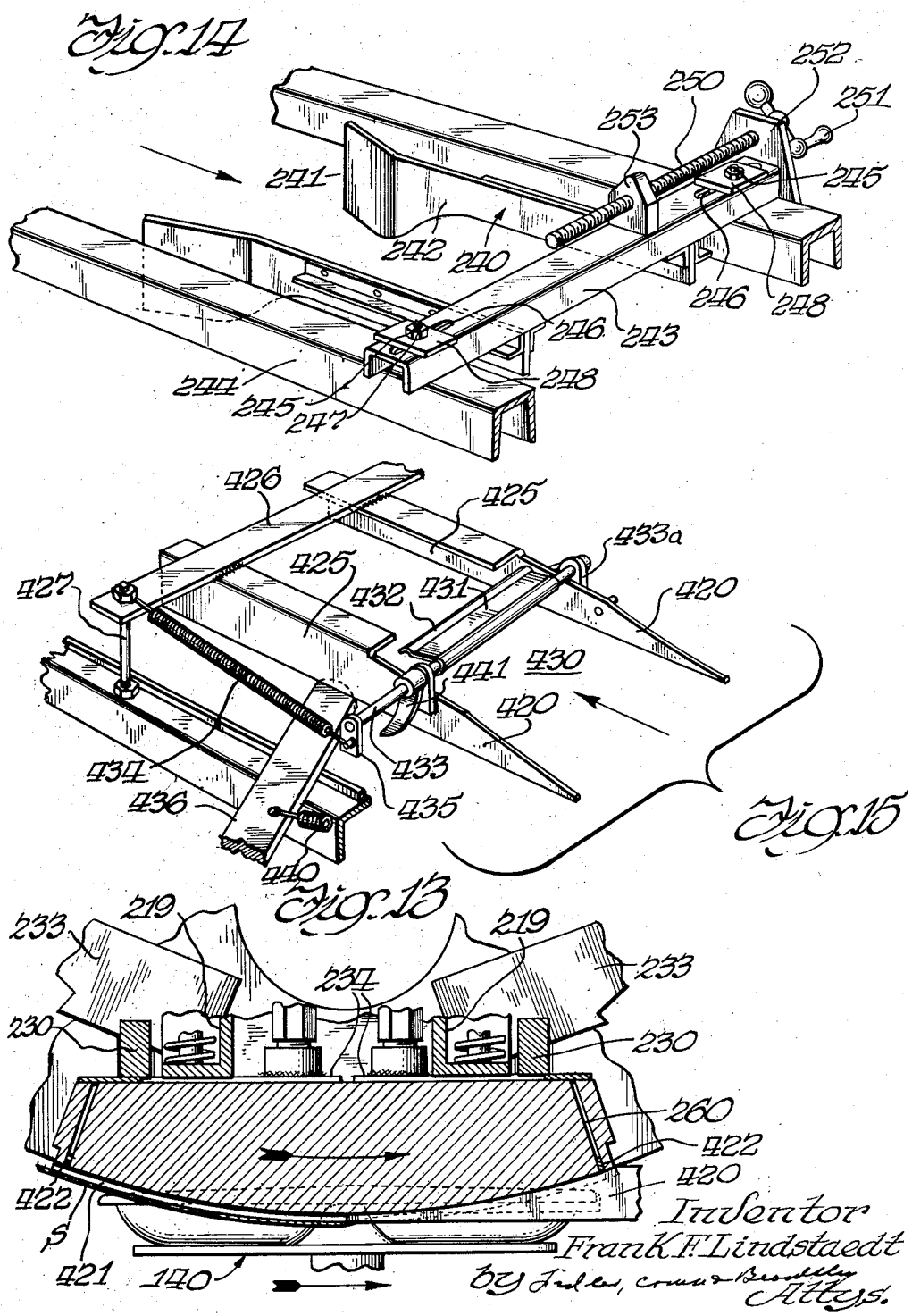

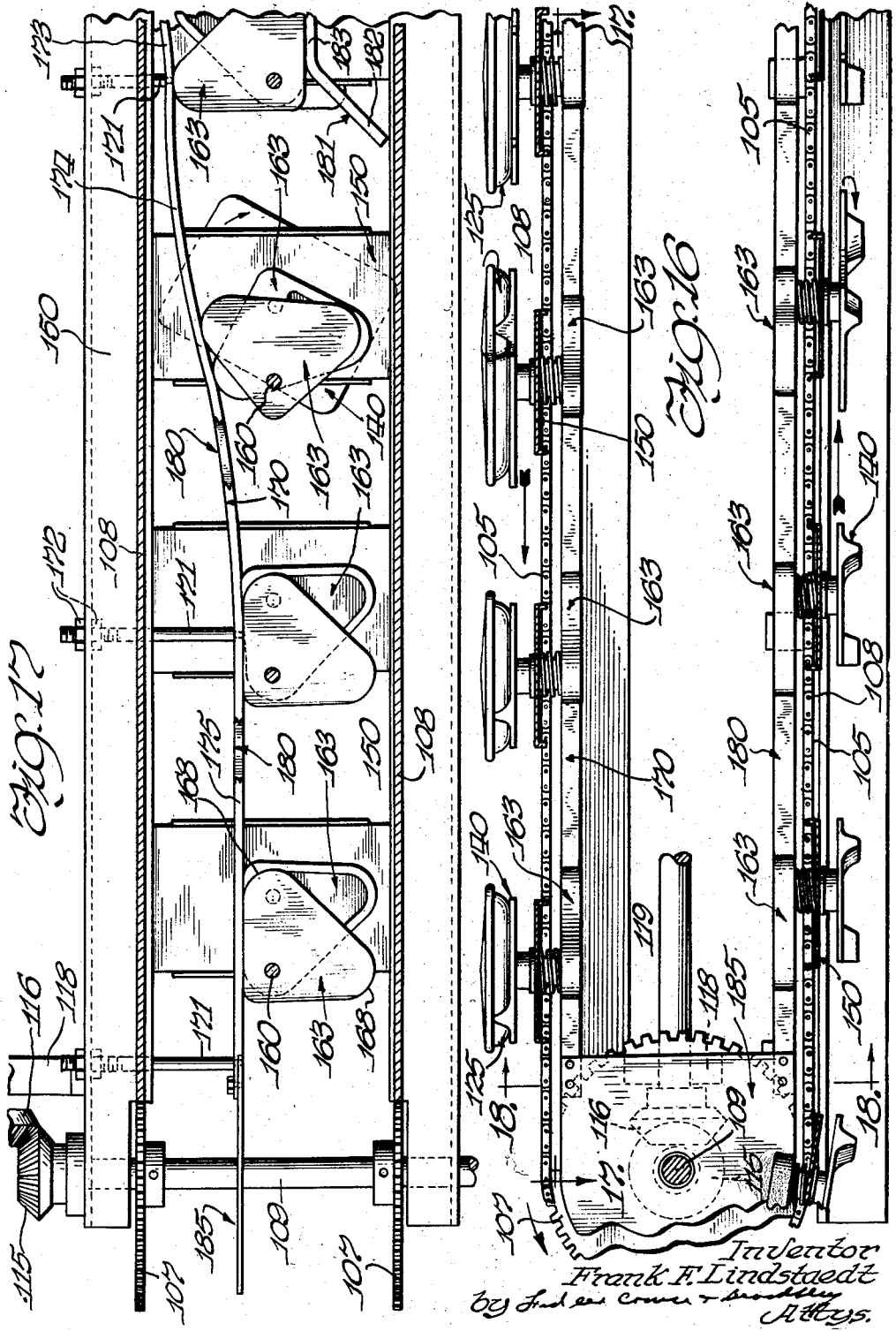

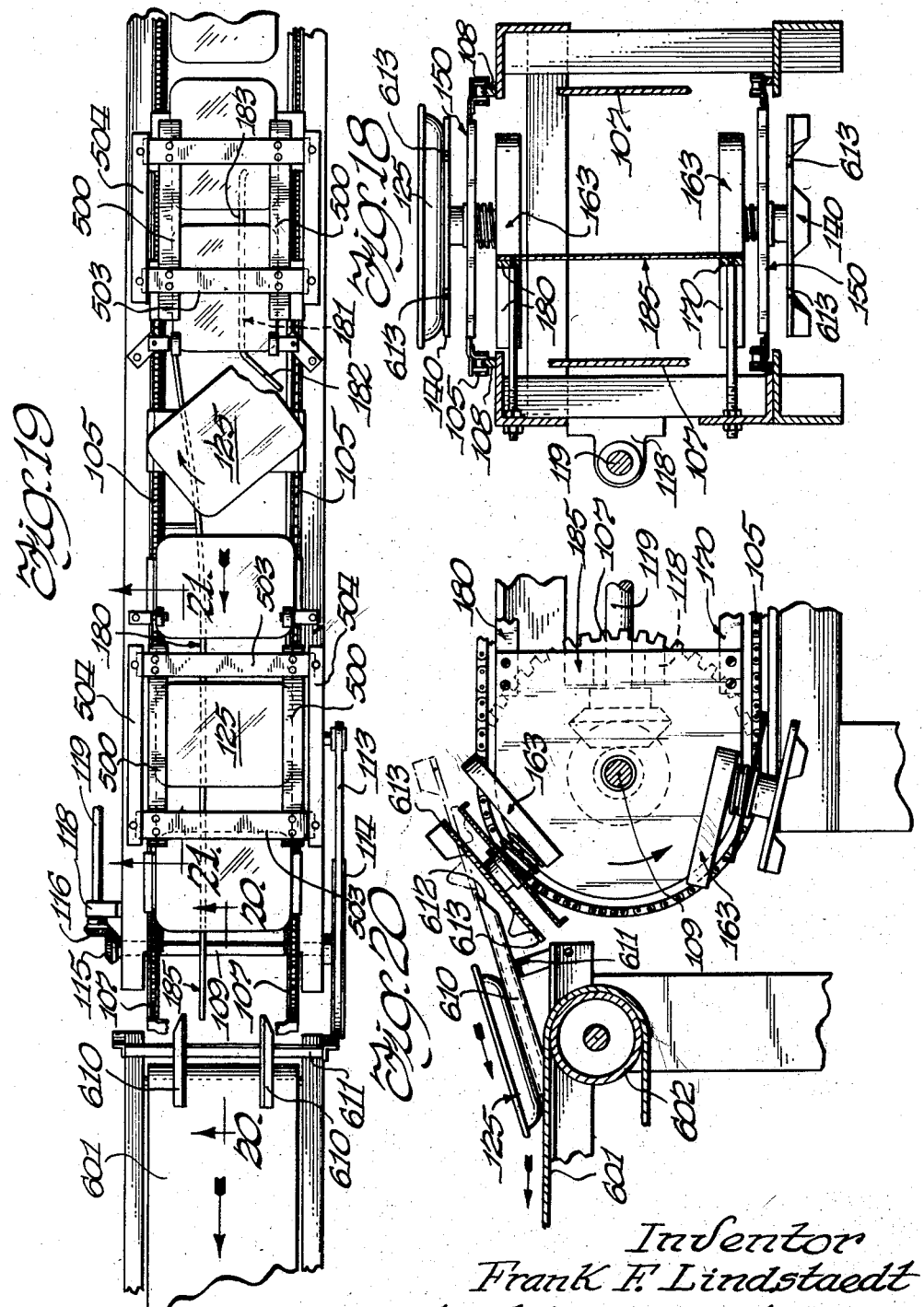

March 15, 1960 F. F. LINDSTAEDT 2,928,222
PACKAGING MACHINE
Filed Aug. 4, 1955 12 Sheets-Sheet 12
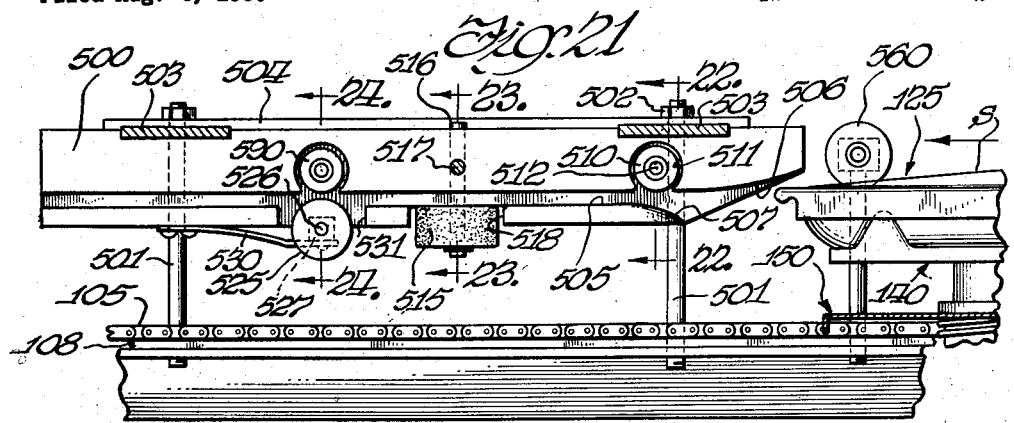
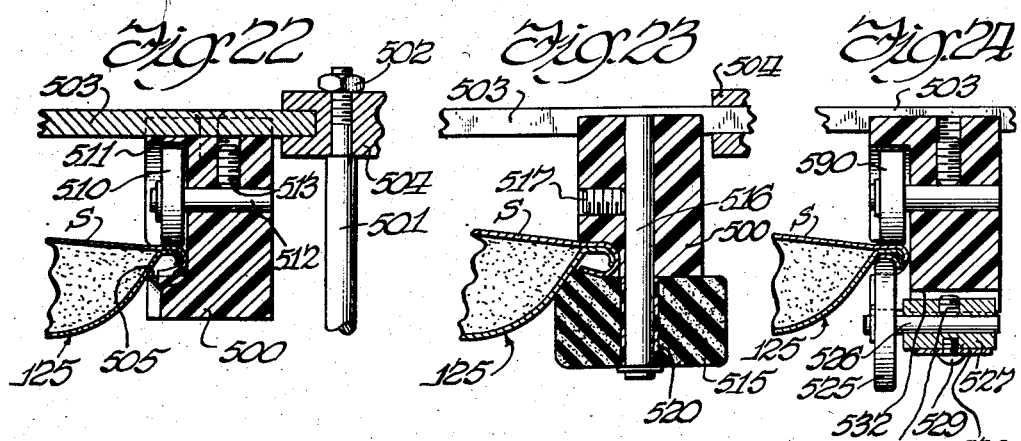
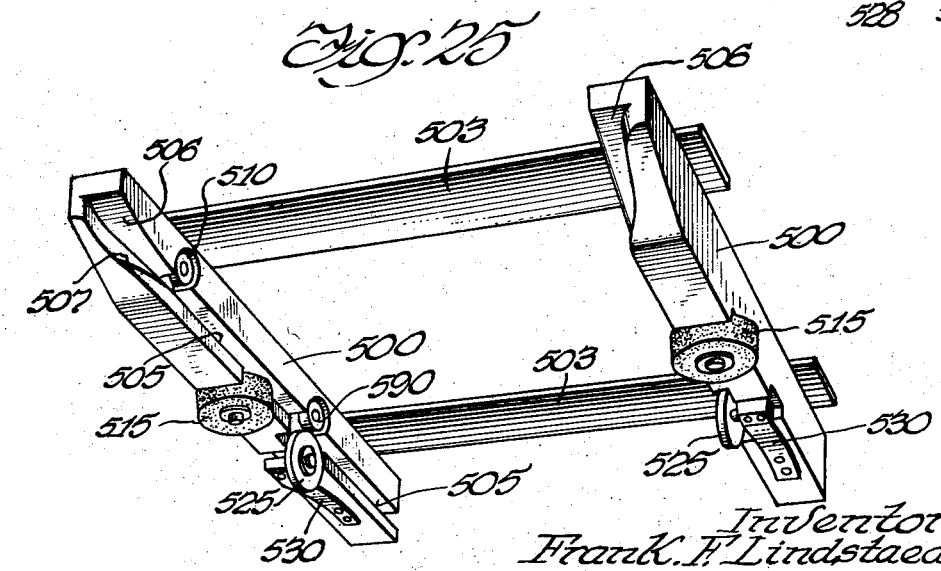
Inventor
Frank F. Lindstaedt

United States Patent Office 2,928,222
Patented Mar. 15, 1960

2,928,222

PACKAGING MACHINE

Frank Floyd Lindstaedt, San Anselmo, Calif., assignor, by mesne assignments, to Campbell Soup Company, Camden, N.J., a corporation of New Jersey Application August 4, 1955, Serial No. 526,415

19 Claims. (Cl. 53—297)

This invention relates to packaging apparatus and has to do more particularly with a machine for applying a sheet-like cover to a rigid, open top tray.

Packages are now in use, especially for precooked frozen food products, in which a rigid open top tray or "plate," usually formed from thin metal, is provided with a cover formed from a flexible sheet, usually metal foil. Such tray or plate customarily is of rectangular shape and is divided into compartments by partitions formed by indenting the bottom or floor of the tray and has a continuous peripheral flange extending outwardly from its upper edges. After the precooked food has been placed in the plate, the sheet which is to form the cover is placed on the plate and secured thereto by crimping it around the plate flange, usually prior to freezing the food in situ in the plate. Owing to the fact that the food product may project irregularly above the level of the top of the plate, the cover-forming sheet cannot always be applied flat to the top of the plate but must be so applied as to allow for such irregular projection of the food product. At the same time, it is desirable that the edges of the sheet be completely folded around the entire peripheral extent of the plate flange, in order to seal the food product in the enclosing plate and cover. Owing to the difficulties presented in the application of the sheet to the plate, this operation has heretofore been performed manually, which is a time-consuming and expensive operation.

An object of my invention is to provide a machine for applying a cover-forming sheet to an open top tray having a peripheral flange extending from its upper edges and for tucking the marginal portions of the sheet around the flange.

Another object is to provide a machine for applying a cover-forming sheet to an open top tray having a peripheral flange extending from its upper edges and containing one or more articles which project above the top edge of the tray and for tucking the marginal portions of the sheet around the flange.

Another object is to provide a machine for applying and securing a cover-forming sheet to an open top tray which machine is fully automatic in operation.

Another object is to provide a mechanism for placing a flexible cover sheet on an open top tray and turning down the marginal portions of the sheet around the rim of the tray.

Another object is to provide a mechanism for tucking the marginal portions of a cover sheet about a peripheral flange of an open top tray and crimping such portions against the flange.

Still another object is to provide a novel conveyor mechanism for moving open top trays along a predetermined path.

A further object is to provide a novel conveyor for moving along a predetermined path open top trays having peripheral flanges, the mechanism being such that it firmly and positively maintains the trays in predetermined positions with the tops and flanges of the trays fully exposed to permit articles to be placed in the tray and a cover sheet to be applied to each tray and crimped about the flanges.

Another object is to provide a conveyor mechanism for moving a series of open top trays along a predetermined straight path with the trays positively positioned and whereby the trays are moved along one portion of such path while oriented in one position relatively to the path and are then rotated about a vertical axis to a position at right angles to the first position for movement along a second portion of the path.

Still another object is to provide a novel carrier for supporting on a conveyor an open top tray having a peripheral flange in such manner that while the tray is positively held on the carrier against lateral displacement, the top and flange are exposed to permit articles to be placed in the tray and the cover sheet to be applied to the tray and crimped around the flanges thereof.

Another object is to provide a machine for applying flexible cover sheets to open top trays having peripheral flanges wherein is provided a rotatable applicator wheel having a series of cavities in its periphery over which cover sheets are placed and a conveyor for moving a series of trays along a path substantially tangent to the wheel whereby the trays are caused to pass into and out of the cavities respectively to thereby register the sheets with the trays and to bend down the margins of the sheets around the tray flanges.

Another object is to provide a machine for applying a cover sheet to an open top tray having a peripheral flange and for tucking the marginal portions of the sheet around the flange which machine is fully and readily adjustable to insure accurate registration of the cover sheet and the tray.

Another object is to provide a machine for applying a cover-sheet to a tray wherein a sheet is covered by an applicator into registry with a tray and is applied thereto which machine has means for insuring that the cover sheet does not adhere to the applicator after application to the tray.

Another object is to provide a machine for applying flexible cover sheets to trays wherein the cover material is fed in the form of a continuous web to the periphery of an applicator wheel and is held against the wheel while sheets are cut from the web in positions whereby as the wheel is rotated the sheets are registered with and accurately applied to the trays.

Another object is to provide a machine for securing a flexible cover sheet to a tray having a peripheral flange including applying the sheet to the tray and bending, tucking and crimping the margins of the sheet around the flange wherein all of the operations in the tray are effected during continuous movement of the tray along a straight path and without halting the tray or altering its direction of movement.

Other objects and advantages of the invention will appear from the following description taken in connection with the appended drawings wherein:

Figure 1 is a side elevational view of a machine constructed in accordance with my invention;

Figure 2 is an enlarged, fragmentary, side elevational view of a portion of the machine of Figure 1;

Figure 3 is an enlarged, fragmentary, top plan view showing the peeler fingers and flapper mechanism;

Figure 4 is an enlarged, fragmentary, side elevational view of a portion of the structure shown in Figure 3 with certain of the parts removed and broken away to show the underlying structure;

Figure 5 is an enlarged, fragmentary, vertical cross-sectional view taken longitudinally through the structure at the portion where the foil applying wheel most closely approaches the conveyor;

Figure 6 is a view showing a section taken along line 6—6 of Figure 5;

Figure 7 is a view showing an enlarged section taken along line 7—7 of Figure 6;

Figure 8 is a face view of one of the foil applying pads;

Figure 9 is a view showing a section taken along line 9—9 of Figure 6;

Figure 10 is a view showing a section taken along line 10—10 of Figure 9;

Figure 11 is a view showing a section taken along line 11—11 of Figure 5;

Figure 12 is a perspective view showing a portion of the tray carrying mechanism together with a tray disposed above the carrier and in position to be placed on the carrier;

Figure 13 is a view showing a section taken along line 13—13 of Figure 6;

Figure 14 is an enlarged fragmentary perspective view of the pad adjusting mechanism;

Figure 15 is a perspective view showing the foil peeler fingers and the flapper mechanism;

Figure 16 is a medial vertical sectional view showing the portion of the conveyor mechanism adjacent the discharge end;

Figure 17 is a view of a section taken along line 17—17 of Figure 16;

Figure 18 is a view of a section taken along line 18—18 of Figure 16;

Figure 19 is a fragmentary plan view of the portion of the conveyor above which the foil tuckers are located;

Figure 20 is a fragmentary sectional view taken along line 20—20 of Fig. 19;

Figure 21 is a view of a section taken along line 21—21 of Figure 19;

Figure 22 is a view of a section taken along line 22—22 of Figure 21;

Figure 23 is a view of a section taken along line 23—23 of Figure 21;

Figure 24 is a view of a section taken along line 24—24 of Figure 1; and

Figure 25 is a perspective view, taken from below, of one of the tucker mechanisms.

For the purpose of facilitating the description of the construction and operation of the machine of my invention I employ the term "front" to designate the loading end of the machine (the left hand end as viewed in Figure 1) and the term "rear" to designate the discharge or unloading end of the machine (the right hand end as viewed in Figure 1).

The machine of my invention may be employed in applying a cover-forming sheet to a tray or plate in a wide variety of applications. For convenience in explaining my invention it is shown and described in connection with its use in applying a metal foil cover-forming sheet to a compartmented, open top, peripherally-flanged, thin metal tray adapted to contain a plurality of precooked frozen food items but it is to be understood that the invention is not limited to such use.

Referring now particularly to Fig. 1 of the drawings, the machine includes a frame 100 having a lower main portion 101 adapted to support a conveyor 120, two tucker mechanisms 121 and 122, and other mechanisms hereinafter described, and an upper frame portion adapted to support a foil applicator wheel 123, and other mechanisms hereinafter described. The frame 100 may be of any suitable construction providing the necessary strength, rigidity and support for the several mechanisms and preferably is constructed from standard structural shapes such as channels, angles and straps all formed from a suitable material, preferably steel. The members are suitably secured together, as by welding to provide the desired rigidity of the frame.

The conveyor 120 is adapted to move plates to be covered along a predetermined path past the foil applicator wheel 123 and the tucker mechanisms 121 and 122. The conveyor 120 includes a pair of endless conveyor elements 105 preferably chains (see especially Figs. 1 and 5) arranged in spaced parallel arrangement and trained around sprockets 106 and 107 carried on shafts 108 and 109 journaled in bearings mounted in the frame 100. The chains 105 are guided by chain guides 110 (see Figs. 5 and 6) supported by the frame 100.

The conveyor 120 is driven at a constant speed by suitable means such as an electric motor 111 (Fig. 1) connected to a speed reducer 112 which drives an endless belt 113 trained around a pulley 114 carried on the shaft 109 which carries the sprocket 107.

The shaft 109 carries a bevel gear 115 (Figs. 1 and 19) which drives a bevel gear 116 carried on a line shaft 119 journaled in bearings 118 supported on the frame 100. The line shaft 119 provides means for driving other mechanisms of the machine hereinafter described.

The conveyor 120 is provided with means for supporting a plurality of trays or "plates" to which covers are to be applied by the applicator wheel 123. While, as above explained, the machine of my invention is capable of adaptation to use with numerous different types and sizes of plates, I have disclosed it for the purpose of illustration in connection with its use in applying aluminum foil covers to sheet metal plates of a type commonly employed for containing precooked frozen food items. Before proceeding further with the description of the machine, it appears advisable to refer to the construction of the plate with which the machine is adapted to be used, in order to aid in an understanding of the machine. Such a plate is shown in Fig. 12 of the drawings to which reference now is made.

The plate 125 is formed from sheet metal, such as aluminum, of sufficient thickness and hardness to maintain the shape of the plate and to permit normal handling without undue damage to the plate. The plate has a bottom wall 126 of generally flat form and of generally rectangular shape. Upstanding from the bottom wall are four side walls 127 which generally diverge outwardly and terminate in a continuous peripheral flange or rim 128 extending horizontally and having a down-turned marginal portion or lip 129 as seen particularly in Fig. 5. A plurality of partitions 130 are formed in the plate by indenting upwardly the bottom wall, (Fig. 12) which partitions extend inwardly from the two end walls of the plate and intersect at approximately right angles at a point spaced from a side wall. A third partition 131 extends from the juncture of the first two partitions 130 to the adjacent side wall of the tray. The partitions 130 and 131 thus divide the tray into three compartments each of which is adapted to receive a separate item of food. It will be seen that the formation of the partitions 130 and 131 by indenting the bottom walls provides corresponding grooves 132 and 133 (Figs. 5 and 4) in the outside face of the bottom wall.

The conveyor chains 105 carry a plurality of plate carriers or tables 140, preferably formed from aluminum, which are secured to the chains 105 in spaced relation throughout the lengths of the latter. Each of the carriers 140 (Fig. 12) is of generally plate-like form and includes a main portion 141 having a generally flat upper surface adapted to support a plate 125 thereon. For the purpose of retaining the plate on the carrier 140 during the movement of the plate along the machine and particularly during the operations of applying the foil to the plate, I provide means for preventing lateral displacement of the plate on the carrier. Such means is so formed as to not interfere with the placing of food items in the plate or the application of the foil. To this end I provide upstanding bosses or studs 142 and 143 so shaped and arranged that when the tray is placed upon the carrier 140 in the desired position, the bosses 142 enter into the grooves 132 formed on the underside of the plate by the partitions 130, and the boss 143 enters both the grooves 132 and also the groove 133 formed by the partition 131. The bosses 142 each are formed of a cross-section generally similar to the cross-section of the grooves 132 and have substantial lengths in their longitudinal direction so as to provide for adequate engagement with the underside of the plate. The boss 143 is provided with portions 144 shaped and arranged to fit snugly in the ends of the grooves 132 at their point of juncture and a portion 145 shaped and arranged to fit in the groove 133.

Preferably the partitions 130, are arranged substantially at right angles to each other and the partition 131 extends generally in a plane bisecting the angle between the partitions 130 and thus when the plate is placed on the carrier it is held firmly against lateral displacement in any direction on the carrier 140. Accordingly the plate is securely held against displacement during the several operations performed in applying the foil to the plate. Thus it is not necessary to provide any other means for holding the plate on the carrier and thus there is no interference with the operation of placing food on the plate or applying the foil.

Each carrier 140 is supported on the conveyor chains 105 by a carrier support 150 (see especially Figs. 5, 6 and 12) of generally plate-like form which extends between the two parallel conveyor chains 105 and is secured thereto. The support 150 is so attached to the chains 105 that it is firmly supported thereby while they are passing along their upper flight path and there is no interference with the passage of the chains 105 and the carriers 150 when the former pass around the end sprockets 106 and 107. To this end the support 150 is of generally plate-like form having a main portion 151 with transverse stiffening flanges 152 extending substantially throughout the length thereof. Projecting outwardly beyond the ends of the main portion are extensions 153 which are positioned to rest upon the upper surfaces of the conveyor chains 105 (when the latter are in the upper flight portion of their travel) whereby to support and steady the plate carrier. The support 150 is secured to the conveyor elements 105 by angle brackets 155 secured to and depending from the extending portion 153 at a portion centrally thereof, (as will be seen particularly from Fig. 11 of the drawings) and attached to the chains 105.

Each carrier 140 is pivotally mounted on the supporting element 150 by a shaft 160 (see Fig. 5) rigidly secured to the carrier 140 as by a pin 161 and extending through a bushing 162 preferably formed of nylon and fixedly secured in the support 150.

Means are provided for positioning each carrier 140, and a plate 125 carried thereby, angularly about the pivot axis of the carrier relatively to the support 150 and consequently relatively to the direction of movement of the carrier along the machine. This means is so constructed and arranged as to provide for movement of the plate along the machine with the longer sides of the plate parallel to the direction of movement of the conveyor through that portion of the travel of the plate leading up to and past the foil applicator wheel and the first tucker, hereinafter described, and for then turning the carrier and plate carried thereby through an angle of 90 degrees whereby the shorter sides of the plate then are parallel to the direction of movement of the plate prior to the time that the plate reaches the second tucker, all for a purpose which will hereinafter appear.

The foregoing movement of the carrier is effected by a cam follower 163 (Figs. 5 and 17) secured to the shaft 160 below the support 150. The cam follower 163 is of generally triangular shape with two apices rounded on relatively large diameter arcs to provide camming surfaces 168. While the cam elements may be made of any suitable material I prefer to form them from nylon.

Means are provided for yieldably maintaining the carrier 140 in a predetermined pivotal position with respect to the support 150 for a purpose which will hereinafter appear. To this end a spring 164 is provided which engirdles the bushing 162 and has one end 165 secured in the support 150 and the other end 166 secured in the cam follower 163. The spring 164 is so wound that it tends to rotate the carrier 140 in a clockwise direction as viewed from above (see Fig. 11). The pin 161 projects from the hub of the carrier in position to strike a stop pin 167 extending vertically upwardly from the support 150. Thus, the cam follower and carrier are normally held yieldably in a position wherein a plate supported on the carrier is disposed with its longer sides parallel to the direction of movement of the carrier through the machine. The spring 164 acts to return the cam follower 163 and the carrier 140 to their initial positions rotationally relatively to the supporting element 150 after these elements have been rotated out of such initial position as hereinafter described.

Fixed cams extending along the path of movement of the cam followers 163 are provided for effecting a turning movement of the plate carriers 140 through 90 degrees after they have passed the first tucker mechanism 121, hereinafter described, and before they reach the second tucker mechanism 122.

To this end I provide a fixed cam 170, which takes the form of an elongate rail, supported as by rods 171 suitably secured to the cam 170 and to the machine frame 100, as by bolts 172. The cam 170 is positioned to be engaged by the cam followers 163 as they are moved along that portion of their path of travel along the upper flight path of the conveyor which extends beyond the first tucker mechanism. The cam 170 is provided with a first or entrance portion 173 which permits the cam follower 163 to pass freely, a turning portion 174 which is inclined inwardly relatively to the path of movement of the cam follower 163 and a straight portion 175 which extends parallel to the path of movement of cam follower 163. The cam 170 thus is so shaped and arranged that it serves to effect rotation of the cam followers 163 successively as they are carried past the turning portion 174. The turning movement of the cam follower is in a counterclockwise direction, as viewed in Fig. 17, and thus the corresponding spring 164 is stressed, the cam follower 163 and connected table 140 being held against return movement by reason of the engagement with the straight portion 175 of the cam 170.

Disposed directly below and shaped similarly to the cam 170 is a lower cam 180 positioned to engage the cam followers 163 as they pass along the lower flight path of the conveyor. The cam 180 thus serves to allow the cam followers 163 and connected carriers 140 to be successively returned, under the influence of the springs 164, to their initial positions (such as the position in which the right-hand cam follower in Fig. 17 appears). For the purpose of insuring that the lower cams are returned to their initial position, a straight cam 181 is provided adjacent the appropriate portion of the path of movement of the cam followers along their lower flight path, which cam has an inclined end portion 182 and a straight portion 183. The straight portion 183 may be of any length but it need only be of sufficient length to insure that the cam followers as they pass therealong are positively returned to their initial position.

In order that the cam followers 163 are returned to their initial positions under the influence of their respective cooperating springs 164, during the passage of the cam followers and carriers from the upper flight to the lower flight of the conveyor, that is, while the chains are passing around the sprockets 107, an end cam 185 is provided which is secured to the ends of the upper and lower cams 170 and 180 and which preferably takes the form of a plate extending outwardly beyond the axis of the sprockets 107 a sufficient distance to remain in contact with the cam followers 163 during the entire portion of their travel from the upper flight path to the lower flight path.

The applicator wheel 123 is provided for the purpose of delivering cover-forming sheets to the plates being carried past the wheel by the conveyor, registering the sheets respectively with the plates and turning down the marginal portions of the sheets around the flanges of the plates. The wheel also serves to feed a strip or web of sheet material to a point at which it is cut into sheets of the proper length before the sheets are registered with the plates.

The wheel 123 includes a pair of side plates 201 and 202 of disc shape, and preferably formed from aluminum, which are rigidly secured on a supporting shaft 203 in spaced, parallel relation. The side plates are formed with openings 204 and 205 respectively through which the shaft 203 extends. Each of the side plates is secured rigidly to the shaft 203 by a C clamp 206 engirdling the shaft on the outside of the plate and secured to the plate by a screw 207 passing through the C clamp and threaded into and securing the C clamp to the side plate. The C clamp is tightened about the shaft by a screw 208 passing through one end of the C clamp and threaded into the other end.

The shaft 203 which preferably is formed from steel is journaled in a pair of bearings 215 (Figs. 1 and 6), one of which is shown, secured on the frame 100. Preferably the bearings 215 are mounted by suitable means (not shown) for vertical adjustment on the frame 100 whereby the wheel 123 may be adjusted to accommodate plates of different heights.

Carried by the side plates 201 and 202 is a series of foil applying pads 210 (Figs. 5 and 8) which are secured to the plates and extend therebetween in a peripherally arranged series and constitute the rim of the wheel. All of the pads 210 are similar in construction and are similarly mounted and therefore only one such pad and its mounting arrangement will be described in detail.

Each pad 210 is of generally rectangular shape and is provided in its outer face with a generally rectangular recess 212 having an outer enlarged portion providing a shoulder or ledge 213. The bottom of the recess 212, and the faces of the ledge 213, and of the rim 214 around the recess, all are arcuate and concentric about the axis of the wheel.

Each pad 210 is secured to the side plates by a pad yoke 218 including a pair of angle members 219 extending between the side plates and a pair of end members 220 secured thereto as by welding and secured to the side plates as by screws 221. The pad 210 is connected to each angle member 219 by two bolts 222 extending through the bottom wall 223 of the recess 212 and countersunk into the wall, a recessed portion 224 being provided in the wall 223 for this purpose. The bolts 222 extend through the angle members 220 and carry at their inner ends nuts 225. The pads are so mounted as to permit radially outward movement thereof in a manner hereinafter explained and for this purpose springs 226 are interspaced between the flanges of the angle member 220 and the nuts 225, as shown particularly in Fig. 10.

Means are provided for adjustably urging the pads 210 radially outwardly of the wheel 123 in order to provide adjustment between the successive pads. In other words, movement of the several pads outwardly provides a greater distance between successive pads and movement of the pads inwardly provides a lesser spacing between pads. This adjustment is provided in order that accurate and effective registration of the cover sheets with the plates may be accomplished.

Radial adjustment of the pads 210 is effected by the provision of a pair of tapered adjustment bars 230 (Figs. 5, 6 and 9) cooperating with each pad. Each adjustment bar 230 is positioned transversely of, that is to say, parallel to the axis of the wheel, between the two side plates 201 and 202 and extends through suitably arranged openings 231 in the side plates, and through slots 232 in bearing plates 233, preferably formed of nylon, and secured to the inner faces of the two side plates 201 and 202. Each adjustment bar 230 extends across and in engagement with the inner face of a pad 210, or more precisely against the inner face of a cover plate 234 secured to the inner face of the pad 210, the purpose of which cover plate will be explained hereinafter.

The adjustment bars 230 being tapered, movement in one direction will effect a camming action causing the adjacent pad to be moved outwardly and movement in the opposite direction will permit the pad to be moved inwardly under the action of the springs 226. Thus, movement of the adjustment bars 230 cooperating with any one of the pads 210, to the right (Fig. 6) will cause the corresponding pad to be moved outwardly. The adjustment bars 230 are free to move in either direction except as such movement is opposed by the friction of the bars against the cover plates 234 and against the edges of the slots 232 in which they move.

For the purpose of providing the desired adjustment of the adjustment bars 230 and for maintaining them in the desired position of adjustment there is provided adjusting mechanism shown particualy in Figs. 4, 6, 9 and 14. Such adjusting mechanism includes a pair of cams 240 each having a cam portion 241 formed with a camming face which extends inwardly in the direction of movement of the conveyor and a straight portion 242 having a guide face extending parallel to the conveyor path. The cams 240 are rigidly secured to a cross bar 243 of rigid construction and which preferably is formed as a channel, whereby the cams 240 are permanently secured in spaced relation with their straight faces 242 in parallelism and spaced apart a distance equal to the length of the adjustment bars 230, taking into consideration the necessary clearance to permit free sliding movement of the adjustment bars 230 along the faces 242.

The two cams 240 are laterally adjustable in unison relatively to the path of movement of the wheel in order to provide for shifting movement of the adjustment bars 230 in the wheel. To this end the cross bar 243 is supported on the frame 100 and more particularly horizontal frame members 244 thereof by bolts 245 passing through the frame members 244 and elongated slots 246 in the cross bar 243 whereby the cross bar 243 may be adjusted laterally with respect to the frame members 244. The bolts 245 are retained by nuts 247, washers 248 being interposed between the nuts and the upper surfaces of the cross bar 243. An adjusting screw 250 carrying a handle 251 is rotatably supported in a bracket 252 secured to the frame member 244 and is threaded into a lug 253 secured to and upstanding from the cross bar 243. Thus it will be seen that rotation of the screw 250 in either direction will effect corresponding movement of the cross bar 243 and shift the cams 240 correspondingly. Thus the desired adjustment of the radial position of the pads 210 may be effected by operation of the handle 251 of the screw 250.

Vacuum means are provided for retaining the strip or web W of cover forming material against the periphery of the wheel in order that the material may be brought into position for cutting and be cut and thereafter brought into registry with a plate passing under the wheel.

Extending laterally across the face of the rim portion of each pad 210 parallel and close to the end edges and terminating just short of the end edges is a slot 260 which extends inwardly in a radial direction to a wide transverse slot 261 in the rear face of the pad 210. A wide slot 262 extends from the slot 261. The cover plate 234 which is of T shape, extends over the slots 261 and 262 to provide closed passages, as will be seen particularly from Figs. 5 and 9.

The cover plate 234 is provided with an opening 264 providing communication between the passage 262 and a hose 265 connected to the cover plate as by a suitable connection 266. The hose 265 leads to a backing ring 270 which is attached as by screws 271 to the side plate 202 and is secured in the ring 270 by a connection 272 bolted into an opening 273 with which the hose communicates, which opening in turn registers with an opening 275 in the side plate 202. Secured in position on the outer face of the side plate 202 concentric with the shaft 203 is a valve manifold ring 280 which is secured to the side plate 202 by the screws 271 and 272 and has an opening 281 registering with the opening 275. The valve manifold ring 280 is formed with a peripheral flange 282 providing a recess in the ring 280, in which recess is located a valve manifold 285 preferably formed from nylon and having an elongated groove 286 extending circumferentially in the inner face thereof throughout slightly less than 270 degrees. The groove 286 is positioned at a radial distance from the center of the ring equal to that of the series of openings 281 in the valve manifold ring and overlies such series for a purpose which will hereinafter appear.

Each pad is similarly provided with passages such as above described and has two hoses leading therefrom and to openings in a manner similar to the hoses described hereinabove.

Each pad is provided with two sets of vacuum passages and has connections similar to those above described so that each of the two vacuum slots in each pad is connected to one of the openings 281 in the manifold ring 280.

The backing ring 270 and the valve manifold ring 280 being secured to the side plate 220 are rotatable therewith. Similarly, the hoses 265, which are connected to the backing ring 270 at one end and at the other end are connected in pairs to the pads 210 in the manner described, all rotate with the side plate and pads. On the other hand, the valve manifold is retained against rotation in a manner now to be described.

The valve manifold 285 is provided with an opening (not shown) through which extends a pin 291 which is secured in the upper frame 102 and which prevents the manifold from rotating about the axis of the wheel, but nevertheless permits it to be displaced laterally toward and away from the valve manifold ring 280.

The valve manifold 285 is yieldably urged into face-to-face sealing abutment with the outer face of the valve manifold ring 280 by a plurality of springs 295 each having its inner end bearing against the outer face of the valve manifold 285 and its outer end bearing against a plate 296 carried by a screw 297 supported in a bracket 298 carried on the upper frame portion 102 and secured in place by a nut 299. The springs 295 thus serve to maintain the inner face of the valve manifold 285 in airtight sealing engagement with the outer face of the recessed portion of the valve manifold ring. It will be understood that the tension of the spring 295 is such as to permit the valve manifold ring to be rotated by the wheel while in sealing engagement with the valve manifold.

Threaded into the valve manifold is a vacuum connection 300 from which leads a vacuum hose 301 which is connected to a suitable suction source, such as a vacuum pump 302. The connection 300 is threaded into an opening 303 which communicates with the elongated slot 286 in the valve manifold whereby vacuum may be applied to the elongated slot. Preferably a plurality of such vacuum connections between the slot 286 and the vacuum pump are provided and two are shown for purposes of illustration.

It will be seen that upon the application of suction to the vacuum connection 301, a vacuum will be drawn on the elongated slot 286 and on all of the openings 281 in the valve manifold ring which are at that time in communication with the elongated slot 286, or "open." Accordingly, a vacuum will be drawn on all of the hoses 265 which register with such "open" openings 281, and correspondingly a vacuum will be drawn on the passages 261 and 262 to which each such hose is connected.

It will be noted that as the wheel rotates, the openings 281 in the valve manifold ring are progressively brought into registry with the elongated slot 286 and remain in communication with such slot through slightly less than 270 degrees of rotation of the wheel whereafter the openings are progressively closed off from the slot and the vacuum thus is closed off so that no vacuum is applied to the corresponding hose 265 and the passages in the head connected thereto. Thus each opening 281 is "open" through slightly less than 270 degrees and is "closed" for a little more than 90 degrees of a revolution.

The spacing between the conveyor 120 and the wheel 123 is such that as each plate 125 is moved under and past the wheel it passes into and out of the recess 212 in one of the pads. The movement of the plate into the recess is progressive beginning at the leading end of the plate and the leading end moves out of the recess before the trailing end enters the recess. The extent of entry of the plate into the recess is limited by engagement by the rim of the plate with the ledge 213 (with the foil sheet S being interposed therebetween) and at any time during the movement the ledge is engaged tangentially owing to its curvature.

As the plate 125 is moved into the recess, the marginal portions of the foil sheet S registered with the plate 125 and which project beyond the periphery of the tray flange are progressively bent down to a position perpendicularly to the top face of the plate rim.

Each pad 210 is provided with means for insuring that the plate 125 and the foil sheet S registered with the plate and having its marginal edges turned down around the rim is released from and moved out of the recess in the pad as the wheel 123 rotates to move the pad upwardly away from the leading portion of the plate. Accordingly, I provide an ejector spring 310 of generally U shape which is secured in the recess in position to engage the leading portions of a tray in the recess. The spring 310 is secured at its end portions to the pad as by screws 311 and is free throughout its remaining portion to move in and out of the recess. The spring 310 is so tensioned that at its forward portion, it projects slightly out of the recess.

Means are provided for limiting outward movement of the ejector spring 310. The forward portion of the spring 310 is provided with a flange 313, and a keeper 314 of flanged construction is secured to the forward portion of the recess 212 in reverse relation to and receiving the flange 315, as shown particularly in Fig. 10 of the drawings. This relation permits the spring to be moved inwardly when the pad moves over the plate and partially receives the plate but limits the outward movement of the spring away from the recess.

The wheel 123 is driven from the line shaft by a power take-off including a bevel gear 320 driving a bevel gear 321 carried on a shaft 322 which carries a sprocket 323 around which is trained a drive chain 324. The drive chain is also trained around a sprocket 325 carried on the shaft 203 which carries the wheel 123. The timing of the rotation of the wheel 123 relatively to the movement of the plate past the wheel, as determined by the movement of the conveyor, that is to say, the phase relationship between the angular position of the drum and the angular position of the sprockets which drive the conveyor chains is adjustable by means now to be described. This means includes an idler sprocket 350 carried on an arm 351 pivoted on the frame and pivotally connected to a bar 352 having a bifurcate end receiving a lock screw 352 threaded into a bracket fixed to the frame 100, and a second sprocket 355 rotatably carried on an arm 356 pivoted to the frame 102 and to which is pivotally connected a bar 357 having a bifurcate end receiving a lock screw 358 is provided. The idler sprockets 350 and 355 engage the chain 324 at different flights thereof.

The timing or phase relation between the drive sprocket 323 and the driven sprocket 325 may be adjusted by adjusting the positions of the two idler sprockets 350 and 355. Appropriate adjustment of the positions of the sprockets 350 and 355 will advance or retard the angular position of the wheel relatively to the drive sprocket 323 and accordingly relatively to the position of the conveyor chains 105.

It will be seen that since both the conveyor chains 105 and the applicator wheel 123 are driven from the same drive mechanism their operation is synchronized. The drive ratios of the drive mechanisms which drive the conveyor and the wheel respectively are so selected that the wheel is rotated to bring the pads respectively into registration with plates carried on the carriers as the carriers are moved past and under the wheel. Adjustment of the timing or phase relationship exact positions of the pads in order that they may register with the plates is effected by the adjusting mechanism just above described. On the other hand, adjustment of the positions of the pads of the wheel in order to adjust the spacing between successive pads so that they will register with the plates respectively is effected by the pad adjusting mechanism described hereinabove.

Suitable means are provided for supporting a roll of cover-forming sheet material, which as hereinabove explained preferably is metal foil. Such means preferably includes a pair of end cones 371 carried on a shaft 372 removably journaled in open top bearings 373 secured on the frame 100.

The web is tensioned and held against the wheel 123 by an idler roll or drum 380 carried on a shaft 381, journaled in bearings 382, carried on a yoke 383 pivotally supported on the frame 102. A spring 384 connected at one end to the yoke 383 and at the other end to a screw 385 threaded into an anchor bracket 386 secured on the frame 100 and adjustably positioned by a nut 387 serves to yieldably urge the roll 380 toward the periphery of the wheel 123. Thus both apply tension to the web and force the adjacent portion into contact with the periphery of the wheel 123. The roll 380 is positioned adjacent the periphery of the wheel 123 at a point substantially in a horizontal medial plane through the wheel 123 and on the rear of the wheel 123. It should be explained at this point that the valving arrangement for the vacuum is such that vacuum is applied to the pads as they approach the outer roll 380 so that the web is picked up and held to the periphery of the wheel 123 by the vacuum and is maintained against the periphery until the sheets S have been cut from the web and applied to the plates as hereinafter explained. Thus the web is held against the periphery of the wheel 200 for a peripheral extent of approximately 270 degrees as illustrated particularly in Fig. 4. In order to aid in maintaining the web against the periphery of the wheel and to prevent wrinkling of the web an idler roll 390 is provided which is carried in a yoke 391 pivotally supported in a bracket 392 carried on the frame 100 whereby the idler roll 390 is gravity urged into engagement with the foil on the periphery of the wheel 123.

A cutter mechanism 399 is provided adjacent the periphery of the wheel 123 for severing sheets from the web prior to the registration of such sheets with the plates passing under the wheel. The cutter mechanism therefore is located forwardly of the wheel 123 and somewhat above the lowermost part of the wheel as seen particularly in Fig. 4. The cutter mechanism 399 includes a shaft 400 rotatably mounted in bearings 401 supported on the frame 100. The shaft 400 carries a cutter blade or knife 402 which is supported against a flat 403 formed on the shaft and is secured thereto as by a screw 404 whereby the cutter blade 402 projects from the shaft in a generally tangential direction. The arrangement is such that as the shaft 400 is rotated the cutter blade 402 is moved into the space between the trailing edge of one pad and the leading edge of the following pad. In order to insure that the cutter blade does not strike against one of the pads, the trailing and leading edges of the pads are cut back or recessed as at 405 (Figs. 5 and 10) thus providing an enlarged slot 406 extending throughout the width of the adjacent pads. The cutter blade 402 is at least as wide as the web and preferably slightly wider to insure that the web is cut throughout its length. Preferably the cutting edge of the blade 402 is formed with pointed teeth to facilitate the cutting of the foil.

The cutter shaft 400 is driven by a sprocket 410 carried on the shaft around which is trained a chain 411 which is also trained around a sprocket 412 carried on the main shaft 203 and rotated thereby. The timing or phase relation between the position of the cutter blade shaft and the wheel 200 is adjusted by an adjusting mechanism which includes a yoke 416 pivotally supported on the frame and carrying a pair of sprockets 413 which are located respectively above and below the sprocket 410 and forwardly thereof as seen particularly in Fig. 2 of the drawings. A further idler sprocket 414 is pivotally carried on a bracket 415 which is supported on the frame 100 for vertical adjustment. The sprocket 414 engages the chain 411 at its upper flight between the sprocket 413 and the sprocket 412. Suitable adjustment of the two sprockets 413 and the sprocket 414 permits adjustment of the timing of the cutter blade shaft relatively to the wheel so as to insure that the cutter blade enters the space 406 between adjacent pads to cut the web and does not strike against either of the pads.

Means are provided for insuring the removal of each of the sheets S of foil from the corresponding pad after such sheet has been registered with a plate. This means includes a pair of "peeler" fingers 420 (Figs. 5 and 14) which are disposed under the applicator wheel 123 in position to enter grooves 421 (Figs. 8 and 15) extending longitudinally along the face of each pad closely adjacent the sides of the recess 212. The peeler fingers 420 are so arranged that they ride in the grooves 421 as the applicator wheel is rotated to bring each pad into foil applying position. The peeler fingers 420 thus serve to remove or "peel" the foil from the surface of the applicator pad progressively as the applicator wheel is rotated and thus insure that the foil does not adhere to the applicator pad face and is thereby prevented from being bent around the edges of the plate as the plate moves into the recess.

Means such as short channels 422 (Fig. 8) are provided at the four intersections of the grooves 421 with the vacuum slots 260 and serve to close off the communication between the vacuum slots and the grooves 421 and thereby insure against the loss of vacuum owing to the presence of the "peeler" grooves 421.

The peeler fingers 420 are suitably supported in the aforesaid position by bars 425 (Fig. 14) with which the peeler fingers 420 preferably are integral. The bars 425 are supported by one or more cross-bars 426 supported on bolts or posts 427 secured in the frame 100 of the machine.

It will be understood that as each plate is carried under the wheel it enters the recess 212 to the extent of the shoulder 213 and thus the foil which has been registered with the plate is bent down around the plate flange as indicated somewhat diagrammatically in Fig. 5. However, this is not always sufficient to insure that the foil will not become dislodged from the plate 125 as the latter moves through the first tucker mechanism 121 and it is therefore desirable that the foil be tucked or folded under the flange along the leading edge of the plate. Accordingly I provide a mechanism which I term a "flapper" mechanism 430 (Figs. 3 and 15) which accomplishes this folding of the cover sheet prior to the movement of the plate past the first flapper mechanism. The flapper mechanism includes a flapper finger 431 which extends a distance substantially equal to the width of the plate and which has its end turned over to form a hook-like portion 432. The finger 420 is rigidly carried on a shaft 433 journaled in a pair of bearings 433a secured to and upstanding from the side bars 425. The flapper finger 431 is normally urged yieldably to a substantially horizontal inactive position (as shown in full lines in Figs. 5 and 15) above the path of movement of the plates by a spring 434 connected at one end to a crank 435 secured on the shaft 433 and at the other end to a fixed point located at the same level as the shaft 433 and therefore is connected to the post 427. The crank 435 (Fig. 15) is positioned approximately at right angles to the finger 431 so that when the latter is in the horizontal, inactive position the crank is in a vertical position.

The finger 431 is adapted to be urged into an active position (as shown in broken lines in Figs. 5 and 15) wherein it folds or tucks the leading edge of the foil around the leading flange of a plate carried on the carrier. The mechanism for moving the flapper finger 431 includes an arm 436 (Figs. 3 and 15) pivotally mounted for swinging movement in a horizontal plane about a fixed vertical pivot 437, the lever being pivoted to a bracket 438 extending from the frame 100. The arm 436 is normally urged, as by a spring 440, to a position (as shown in broken lines in Fig. 3) transversely of the path of movement of the plate carriers 140, with the end of the lever positioned to be engaged by each carrier 140 and moved out of such position and into a position (such as shown in full lines in Fig. 3) wherein it bears against the side edge of the carrier. It will be seen that as soon as the carrier moves past the position in which it is engaged by the arm 436 the latter is rapidly snapped back to its original position by the spring 440.

Lying in the path of movement of the arm 436 in position to be engaged thereby as the arm 436 is snapped back to its original position is a cam 441 fixed to the shaft 433. Thus, when the arm 436 is moved rearwardly by its spring 440 it strikes the cam 441 and thereby causes pivotal movement of the shaft 433 and corresponding movement of the finger 4431 from its inactive position toward its active position. The crank 435 is correspondingly moved (in a counterclockwise direction as viewed in Fig. 15) to a position above the horizontal and extending forwardly wherein the spring 434 exerts a force thereon tending to rotate the crank in a counterclockwise direction (as viewed in Fig. 15), thereby tending to hold the finger against the edge of the plate.

It should be noted that the angular displacement and subsequent release of the arm 436 by each of the carriers 140 causes movement of the finger 431 from inactive to active position to tuck the foil sheet under the leading flange of the plate on the carrier next following the carrier which caused such movement of the arm. In other words each carrier actuates the flapper mechanism to tuck the cover against the plate on the next carrier.

Further movement of the plate along its path moves the finger 431 rearwardly to a substantially vertical position and at the same time the crank 435 is moved to a horizontal position in which the crank and spring are in a "dead center" position. Further movement of the plate correspondingly moves the finger which causes the crank 435 to be moved out of its dead center position, whereupon the spring 434 snaps it in a clockwise direction (as viewed in Fig. 15) thereby rocking the finger 431 out of the path of the plate and permitting the latter to move freely under the finger without interference therefrom.

Pivotal movement of the shaft 433 and the members carried thereby is limited by an arm 442 fixed thereon which moves between a pair of spaced stops 443 and 444 fixed to the side of one of the side bars 425.

Disposed rearwardly of the flapper mechanism 419 is the first tucker mechanism 121. The two tucker mechanisms 121 and 122 are identical in construction and operation except that the plows and accordingly the guide surfaces, tucker wheels and rollers are spaced apart more widely in order to accommodate the plates which, when they pass through the second mechanism are turned to positions crosswise of the conveyor. Accordingly only the first mechanism 121 will be described in detail.

The tucker mechanism 121 (Figs. 21 and 25) includes a pair of similar side members or plows 500 suitably supported on the frame 101 by posts 501 and connected by straps 502. Each plow 500 is formed of a suitable material, preferably nylon and is provided with an inwardly opening groove 505 extending substantially throughout its length and having forwardly diverging cam surfaces 506 and 507 at its forward end, the upper surfaces 506 extending forwardly beyond the forward end of the lower surface 507.

A guide roll 510 is mounted in a recess 511 formed in the inner face of the plow 500 and opening into the slot 505. The guide roll 510 is mounted above the lower cam surface 507 and cooperates therewith in bending the side portions of the cover sheet around the plate flange, as illustrated in Fig. 22. The roll 510 is rotatably mounted by a bearing (not shown) on a shaft 512 which is fixedly secured in the side member 500 as by a set screw 513.

Disposed forwardly of the guide roll 510 is a roll 515 formed of very soft yieldable material such as sponge neoprene. The roll 515 is rotatably mounted by a bearing 520 on a vertically arranged shaft 516 fixedly secured in the plow 500 as by a set screw 517. The roll 515 is disposed in a slot 518 extending transversely across the bottom of the plow 500 in the portion immediately below the slot 505. Thus the roll 515 has its upper side face disposed in opposition to the upper wall of the slot 505. The roll 515 also is of sufficient diameter to project laterally beyond the side faces of the side member 500 and thus is positioned to bear against the side wall of a plate passing by the roll and to be deformed upwardly to thereby bend the marginal edge of the cover sheet upwardly toward the underside of the corresponding plate flange, as illustrated somewhat diagrammatically in Fig. 23.

Disposed rearwardly of the roller 515 is a pair of rollers including a guide roll 520 preferably formed of nylon and arranged and mounted in a manner similar to the guide roll 510. Disposed below the roll 520 is a roll 525 preferably formed of neoprene of a durometer hardness of from 35–40. The roll 525 is rotatably carried, as by a bearing (not shown), on a shaft 526 secured in a sleeve 527 as by a set screw 528. The sleeve 527 is secured as by a screw 529 to the end of a leaf spring 530 the other end of which is firmly secured to the bottom face of the plow 500. The roll 525 is supported for movement in a vertical slot 531 formed in the inner face of the plow 500 and communicating with the slot 505. A downwardly open slot 532 formed in and extending transversely of the bottom face of the plow 500 permits the desired movement of the sleeve 527.

The roll 525 is positioned in alignment with and below the roll 520 and serves to crimp the inturned marginal portion of the cover sheet against the lower side of the plate flange owing to the fact that the plate is held firmly by the guide roll 520. The spring 530 is sufficiently strong to provide this crimping action but at the same time is not so strong as to prevent the roll 525 from riding over the front and rear flange portions of the plate as it moves through the tucker mechanism.

I provide means above the path of the carrier, between the two tucker mechanisms, for retaining the plates on the carriers against any tendency created by the tuckers to dislodge the plates. To this end two pairs of hold down rolls 560 are provided. One pair of rolls 560 (Figs. 1, 2 and 19) is disposed a short distance behind the first tucker mechanism 121 and the second pair a short distance ahead of the second tucker mechanism.

Each hold down roll 560 is rotatably mounted above the path of movement of the plates in position to ride on top of one of the side flanges thereof respectively as the plate is moved along its path. Each roll is suitably supported, as by a vertical post 561 secured to the frame 100. It will be noted that the rolls 260 of each pair are appropriately spaced apart so that they engage the side flanges of the trays.

At the rear or discharge end of the conveyor I provide an auxiliary conveyor for receiving the covered plates and transporting them to a point of freezing or other operation. The auxiliary conveyor (Figs. 1, 19 and 20) is supported on a frame 600 and includes an endless conveyor element 601 such as a belt trained around drums 602 and 603 rotatably mounted in the frame 600. The conveyor element 601 is driven in a suitable manner as by a motor 604 driving an endless belt 605 which is connected in driving relation to the conveyor belt 601 as by a pulley (not shown) mounted on the shaft which mounts the drum 603.

The upper flight of the endless belt 601 is disposed sufficiently below the level of the plate carriers when they are moving along their upper flight path so as to permit the plates to be discharged from the carriers and moved by gravity onto the endless belt 601.

In order to provide for positive removal of the plates from the carriers and to guide them onto the endless belts, I provide a pair of strippers 610 which take the form of a pair of spaced blades preferably formed by angles with one leg extending horizontally and suitably supported as by a bracket 610 and the other extending vertically and constituting the stripper blade. Each blade is formed with a tapered forward edge 612 the blade being positioned to enter notches 613 (Fig. 12) formed in the leading edge of the plate carrier as the carrier is moved from its upper flight path toward its lower flight path. The ends of the blades therefore engage the corresponding portion of the bottom of the plate and move the plate off the carrier as the latter is moved downwardly. As the carrier moves around its arcuate path from its upper flight path to its lower flight path the plate is progressively removed from the carrier and when the lugs 142 and 143 are disengaged from the corresponding grooves in the plates the plate is free to slide down along the blades and onto the endless belt 601 by which the plate is carried to the point of further use. It will be noted that the rearward ends of the blades are tapered so that the upper edges are brought into close proximity to the upper flight of the endless belt 601 and the plates thus are deposited on the endless belt 601 without undue shaking or jarring.

The operation of my machine will now be described.

A roll of foil 372 is placed in the foil holder and the web W is trained around the idler roll 380 and around the periphery of the wheel 200 and carried under the second idler roll 390.

The motor 111 is energized and drives the belt 113 which rotates the pulley 114 and the shaft 109 carrying the sprockets 107 which cause the endless conveyor chains 105 to move. At the same time the line shaft 119 is rotated to drive the power take-off and consequently to drive the chain 324 which, acting through the sprocket 325, rotates the wheel shaft 203 to turn the wheel 123. The rotation of the shaft 203 causes the sprocket 412 to be rotated which, acting through the chain drive 411, rotates the cutter shaft 400.

The vacuum pump is energized in order to draw a vacuum on the vacuum slots 360 in those of the pads which are appropriately located. The pads which are not so located do not have vacuum applied thereto until, in the course of the operation of the machine, they are rotated into appropriate positions.

The pads 210 are suitably adjusted by actuation of the adjustment bars 230 in the manner above described so that the spacing between the successive pads around the periphery of the wheel corresponds with the spacing of the plates on the carriers 140 carried by the conveyor. The timing or phase relation between the pads on the wheel and the plates on the carriers is adjusted by appropriate adjustment of the position of the idler sprockets 350 and 355 so that each pad registers with a plate being carried under the wheel.

The timing or phase relation of the cutter blade 402 relatively to the spaces between successive pads 210 is adjusted by appropriate adjustment of the idler sprocket yoke 412 which carries the sprockets 413 and the adjustment of the sprocket 414.

Plates are placed on plate carriers at the front or loading end of the machine. The plates are moved along the machine by the conveyor 120 past and under the applicator wheel 123 and past the two tuckers 121 and 122 and are discharged from the conveyor at the discharge end of the machine onto the auxiliary conveyor by which they are conveyed to a point of further disposition such as a freezing operation. As the plates move along the forward portion of the conveyor 120, items of food are placed in the several compartments. By the time the plates reach the applicator wheel 123 all of the food items which are to be contained in the plates are in place. It will be understood, of course, if desired, the food items may be placed in the plates at some other locations and the plates with the food items already therein placed on the conveyor. In the latter case, the conveyor of course need not be so great in length since it serves merely to convey the plates past the foil applying and tucking mechanisms.

As the wheel 123 is rotated, vacuum is drawn on the vacuum slots 260 as each such slot reaches a position just beyond the pressure roll 380. Vacuum continues to be drawn on each slot during its rotation through slightly less than 270 degrees and is released when each slot reaches the bottom of its path namely a position directly under the axis of the wheel. Accordingly the web W and the sheets S which are severed from the web as hereinafter explained are retained against the periphery of the wheel by such vacuum. The idler roll 390 serves to aid in maintaining the web against the periphery of the wheel and to smooth out the foil as it passes such roll.

As each slot 406 between successive pads 210 passes the cutter mechanism, the cutter blade 402 is rotated into position to cut the web at a point thereon overlying the slot 406. Thus the material which has passed the cutter mechanism is in the form of a sheet having a length equal to the distance between two successive slots 406. Such sheet is held against its corresponding pad by the vacuum, and is carried by the pad into registry with a plate 125 being moved into position under the wheel 123. As the plate is moved toward its position under the wheel and before it reaches such position the leading portion of the plate enters the recess 212 to the extent determined by the shoulder or ledge 213. The plate progressively enters the recess to the extent indicated in a direction from the leading end toward the trailing end and progressively leaves the recess, owing to the arcuate shape of the rim of the pad 210 and the corresponding shape of the shoulder 213. In other words the shoulder 213 engages the side edge portions of the tray in a tangent relationship.

It will be seen that as the plate and the corresponding pad are moved toward a position in which the plate progressively enters the recess, the marginal portions of the foil sheet S are turned down around the peripheral portion of the flange 128, to a vertically depending position, as shown particularly in Fig. 5.

As the leading portion of the plate 125 enters the recess in the pad it forces the leaf spring 310 inwardly and thereby tensions the spring. As the pad and plate are rotated past the lowermost point of travel of the pad, the plate moves out of the recess. However, should there be any tendency for the plate or the applied foil sheet to remain in the recess the tension of the spring 310 is sufficient to force the plate and foil progressively out of the recess.

As the plate 125 is advanced further along its path of movement the side edges of the foil are progressively bent down around the periphery of the plate flange to a vertically depending position and finally the rear marginal portion is bent down around the trailing portion of the plate flange to a similar position.

As the leading portion of the pad and more particularly the vacuum slot 260 passes through the lowermost point in its travel, the vacuum is cut off thus releasing the leading edge of the foil. Thus the only vacuum remaining on the foil is that applied by the vacuum slot at the trailing edge of the pad. Since no vacuum is applied to the side marginal portions of the foil, there is no tendency to retain the foil against the pad as the side portions of the plate progressively move into and out of the recess.

As the trailing vacuum slot 260 passes through the lowermost point in its travel, the vacuum is cut off and the trailing marginal portion of the foil is released from the face of the pad and permitted to be bent down around the periphery of the plate flange as the trailing portion of the plate enters the recess.

As the leading edge of each pad 210 reaches the lowermost point on its circular path, the fingers 420 (Fig. 15) enter the grooves 421 and peel the foil sheet S progressively from the face of the pad, so as to insure that the sheet does not cling to the face of the pad and thereby insure that the edges of the sheet are progressively bent down around the periphery of the plate flange as the plate passes into and out of the pad recess. It will be noted that since the vacuum is cut off each of the vacuum slots as the corresponding slot passes the lowermost point in its travel, the sheet is no longer held by the vacuum as it passes by the peeler fingers 420 and there is no resistance to the peeling action.

Shortly after the leading portion of the plate moves out of the recess the flapper mechanism is actuated in the manner above described to cause the flapper finger 431 to be moved into position to fold or tuck under the leading flange of the plate that portion of the sheet which depends from such flange. Thus the leading edge of the foil grips the leading flange of the plate so that when the plate passes into and through the first tucker mechanism the foil is not stripped from the plate.

The plate 125 with the foil applied thereto and bent down around the peripheral edges and tucked under the leading flange of the plate is advanced along its path of movement by the conveyor.

As the leading portions of the plate are moved into engagement with the plows 500 of the first tucker mechanism 121 the depending marginal portions of the foil at the sides of the plate parallel to the direction of movement ride onto the surfaces 507 and are thereby folded under the corresponding side flanges of the plates, as illustrated particularly in Fig. 22. During this movement the guide rolls ride along the upper surfaces of the foil which overlie the side flanges of the plate and presses the corresponding portions of the foil against the corresponding flanges.

Upon further movement of the plate the flange portions, with the foil folded therearound, pass into the slots 505 and are carried past the rolls 515. The inner and upper peripheral portions of these rolls are deformed by the sides of the plate and so as to further fold the marginal portions of the foil along the side flanges of the plate, as illustrated in Fig. 23.

Finally the plate is advanced to a position wherein the side flanges with the foil folded thereon passes between the guide rolls 520 and the crimping rolls 525 and the marginal portions of the foil are crimped tightly against the lower faces of the plate side flanges as shown particularly in Fig. 24.

After the plates are carried past the first tucker mechanism 121 the plate carriers are turned through 90 degrees and into a position wherein the shorter side edges are parallel to the direction of movement of the plate as shown particularly in Fig. 19. After the plates have been turned to their new positions they pass through the second tucker mechanism 122 which, as above stated, is similar in construction and operation to the first tucker mechanism except that the plows are more widely spaced in order to accommodate the wider dimension of the plate when in its turned position. As the plate is carried past the second tucker mechanism the marginal portions of the foil are folded about and crimped to the end flanges in a manner similar to that in which it was folded and crimped about the side flanges by the first tucker mechanism.

During the movement of the plate carriers from the front or loading end of the conveyor past the applicator wheel and past the first tucker mechanism, the plate carriers, and the plates carried thereby, are in what may be termed "normal" position. Thus, there are no cams or cam rails for engagement by the several cam followers 163.

The plate carriers 140 are urged by the springs 164 into a position wherein the stop pin 161 engages the stop 167 and the plates on the carriers are positioned with their side edges parallel to the direction of movement of the carrier. However, immediately after the carriers are moved past the first tucker mechanism the cam followers 163 engage the turning cam 170 and are turned through an angle of 90 degrees with the result that the carriers and plates carried thereby are turned through a similar angle and the plates then proceed along the path of travel with their end edges parallel to the direction of movement.

The cam followers are retained in their rotated position by the turning cam 170, the end cam 185, and the lower cam 180 until they reach a position in their lower flight path wherein the lower cam 180 permits the cam followers and corresponding carriers to be rotated by the spring 164 back to their initial position. The straightening cam 181 insures that the cam followers and plate carriers are returned to their initial position and they continue on their lower flight paths to and around the front end of the machine and back onto the upper flight path in their normal position.

As the carriers and plates carried thereby reach the end of the upper flight path and start to pass around the end of the conveyor the plates are removed from the carriers by the blades 610 and slide down the blades on the conveyor 601 by which they are conveyed to a point of several operations.

During the movement of the carriers along their upper flight path, the supports 150 bear throughout their lengths upon the chains 105. Thus, the carriers and the plates carried thereby are stably and firmly supported whereby the various operations of applying the foil may be carried out readily. On the other hand when the carriers reach the end of their upper flight path and move around the end of the conveyor, there is no interference with such movement since the supports are connected to the chains only at one point.

It is to be understood that the conveyor in accordance with my invention while especially useful in connection with a foil applicator of the type embodied in my invention, nevertheless is also capable of use with other forms of foil applicators. In fact the conveyor is well adapted for use in conveying the plate along a predetermined path for filling and for application of the cover by a manual operation. It should also be understood that the foil applicator in accordance with my invention is capable of use with other types of tucking mechanisms or with manual tucking operation as well as with the specific tuckers illustrated and described herein. The tucker mechanism in accordance with my invention is capable of use with other types of foil applicators or even where the foil sheet is applied by hand.

It will be seen from the foregoing that my invention provides a machine for applying flexible cover sheets to trays having peripheral flanges and for tucking the marginal portions of the sheets under the flanges, which machine is fully automatic and is effective to accurately register the cover sheets with the trays and to tuck the margin under the flanges.

The machine is fully adjustable whereby it provides accurate registry of the sheets and the trays and also permits use of the machine with trays of different sizes and shapes. The pads of the applicator wheel are readily adjustable radially and thus provides accurate registry with the trays on the conveyor. Moreover, the construction is such that the pads may be removed and replaced by pads having cavities of other sizes. The drive for the applicator wheel is adjustable which permits adjustment of the timing of the relative movement of the pads and the trays on the conveyor.

The machine is so constructed that all of the operations on the tray including the applying, bending, tucking and crimping of the cover sheets is effected during movement of the trays along a straight path and it is not necessary to halt the trays or to alter the direction of movement to effect any of these operations. Thus the machine may be operated at a relatively high production rate.

The cover material is delivered to the applicator wheel in the form of a web and sheets are cut from the web after the web has been placed over the cavities or recesses. Thus there is no problem of registering the sheets with the cavities and there is no likelihood of false or inaccurate registration. The sheets are positively held in registry with the cavities until applied to the trays and then released when the trays pass out of the cavities. The peeler fingers insure that the sheets do not adhere to the pad and are removed with the tray. Moreover, they insure that the sheets are removed even where a tray may have not been placed on the carrier.

The flapper mechanism tucks the margin of the cover sheet under the leading flange of the tray so that the tray grips the sheet and carries it positively to and through the first tucker mechanism. This insures that the cover sheet will not be dislodged from its proper position on the tray during such portion of the travel of the tray.

The tucker mechanisms provide a rapid and effective means for not only tucking the margins of the foil under the flange portions of the trays but also crimping the margins firmly against the under sides of the tray flange. Thus the cover sheet provides a substantially moisture proof and air tight seal.

The conveyor mechanism provides means for advancing the trays in timed relation to the movement of the cavities in the periphery of the applicator wheel, advancing the trays past the tucker mechanisms, turning the trays during this movement between the two tucker mechanisms and discharging the trays to a table or receiving conveyor. The carriers are so formed that they support the trays positively against displacement thereon during the several operations. On the other hand the tops and flanges of the trays are fully exposed so as to permit food items to be placed in the trays, and the cover sheets registered with the trays and tucked around the flanges.

I claim:

1. Apparatus for applying a flexible cover to a rigid, generally rectangular tray having a peripheral flange, said apparatus comprising a conveyor for moving a tray along a predetermined path with two opposite sides of the tray parallel to the direction of movement, applicator means adjacent the path of movement of the tray for placing a flexible cover sheet on the tray, a first tucking means beyond said applicator means for folding opposite marginal portions of said sheet around and crimping them under the two flange portions which are parallel to the direction of movement of said tray past said first tucking means as said tray moves past said first tucking means, means beyond said first tucking means for turning said tray on said conveyor to a position perpendicular to its initial position, and a second tucking means beyond said turning means for folding opposite marginal portions of said sheet around and crimping them under the two flange portions which are parallel to the direction of movement of the tray past said second tucking means as it moves past said tucking means.

2. Apparatus for applying a flexible cover to a rigid, generally rectangular tray having a peripheral flange with an edge extending downwardly from the main portion of the flange, said apparatus comprising a conveyor for moving a tray along a predetermined path with two opposite sides of the tray parallel to the direction of movement, applicator means adjacent the path of movement of the tray for placing a flexible cover sheet on the tray, a first tucking means beyond said applicator means for folding opposite marginal portions of said sheet around and crimping them under the edges of the two flange portions which are parallel to the direction of movement of said tray past said first tucking means and against the main flange portions as said tray moves past said tucking means, means beyond said first tucking means for turning said tray on said conveyor to a position perpendicular to its initial position, and a second tucking means beyond said turning means for folding opposite marginal portions of said sheet around and crimping them against the two flange portions which are parallel to the direction of movement of the tray past said second tucking means and against the under side of the main flange portion as said tray moves past said second tucking means.

3. Apparatus for applying flexible cover-sheets to rigid trays having peripheral flanges comprising an applicator wheel having a series of cavities in its periphery each shaped and dimensioned to receive therein a tray to be covered, a conveyor disposed to advance a series of trays along a path generally tangent to said applicator wheel in position for trays on said conveyor to pass in succession, into and out of said cavities respectively, means for registering a cover sheet with each of said cavities, means for driving said conveyor, and means for rotating said applicator wheel in timed relation to the movement of said conveyor whereby as each tray is moved into position in a cavity, a cover sheet is registered with the tray and the marginal portions thereof are turned down over the flange of the tray.

4. Apparatus for applying flexible cover-sheets to rigid trays having peripheral flanges comprising an applicator wheel having a series of cavities in its periphery each shaped and dimensioned to receive therein a tray to be covered, a conveyor disposed to advance a series of trays along a path generally tangent to said applicator wheel in position for trays in said conveyor to pass into and out of said cavities, respectively in succession, means for registering a cover sheet with each of said cavities, means for driving said conveyor, means for rotating said applicator wheel in timed relation to the movement of said conveyor whereby as each tray is moved into position in a cavity, a cover sheet is registered with the tray and the marginal portions thereof are turned down over the flange of the tray, and a spring element in each cavity positioned to be engaged and tensioned by a tray as the latter enters the cavity and engages a cover sheet and effective to urge the tray and cover sheet from said cavity as the applicator wheel is rotated to move the cavity away from said conveyor.

5. Apparatus for applying flexible cover sheets to trays having peripheral flanges comprising an applicator wheel having a series of cavities in its periphery, each shaped and dimensioned to receive therein a tray to be covered, a conveyor disposed to advance a series of trays along a path generally tangent to said applicator wheel in position for trays to pass into and out of said cavities respectively in succession, means for driving said conveyor, means for rotating said wheel in timed relation to the movement of said conveyor, means for feeding a web of cover material to said applicator wheel, means ahead of the point at which trays enter said cavities for severing from said web sheets overlying said cavities respectively, means for retaining said web and said sheets over said cavities, and means for releasing said sheets as said trays pass out of said cavities.

6. Apparatus for applying flexible cover sheets to trays having peripheral flanges comprising an applicator wheel having a series of cavities in its periphery, each shaped and dimensioned to receive therein a tray to be covered, a conveyor disposed to advance a series of trays along a path generally tangent to said applicator wheel in position for trays to pass into and out of said cavities respectively in succession, means for driving said conveyor, means for rotating said wheel in timed relation to the movement of said conveyor, means for feeding a web of cover material to said applicator wheel, means ahead of the point at which trays enter said cavities for severing from said web sheets overlying said cavities respectively, means for retaining said web and said sheets over said cavities and for releasing said sheets as said trays pass out of said cavities, said last means including openings in the periphery of said wheel ahead of and behind each of said cavities and means for drawing a vacuum on each of said openings during its movement from a point adjacent said web feed to the point at which a tray begins to pass out of the cavity.

7. Apparatus for applying flexible cover sheets to trays having peripheral flanges comprising an applicator wheel having a series of cavities in its periphery, each shaped and dimensioned to receive therein a tray to be covered, a conveyor disposed to advance a series of trays along a path generally tangent to said applicator wheel in position for trays to pass into and out of said cavities respectively in succession, means for driving said conveyor, means for rotating said wheel in timed relation to the movement of said conveyor, means for feeding a web of cover material to said applicator wheel, means for releasably holding said web against said wheel, means ahead of the point at which trays enter said cavities for severing from said web sheets overlying said cavities respectively, means for retaining said sheets over said cavities, means for releasing said sheets as said trays pass out of said cavities, a pair of grooves in the periphery of said wheel adjacent and parallel to the sides of each of said cavities, and a pair of fingers fixedly supported adjacent said applicator wheel in position to enter and pass along said grooves as said tray moves out of each cavity to thereby peel the cover sheets from the periphery of said applicator wheel.

8. An applicator mechanism for applying flexible cover sheets to rigid trays having peripheral flanges comprising a frame, an applicator of generally cylindrical form and having a series of outwardly open cavities around its periphery, each cavity being shaped to receive at least the upper portion of a tray, means for rotating said applicator, means for registering cover sheets with said cavities respectively, means for releasably retaining said sheets against said applicator in registry with said cavities respectively, means for moving a series of trays past said applicator in timed relation to the movement of said cavities and in position to pass into and out of said cavities respectively, and means for successively releasing the sheet registered with each cavity as the tray moves out of the cavity.

9. An applicator mechanism for applying flexible cover sheets to rigid trays having peripheral flanges, said mechanism comprising a frame, means rotatably supporting said frame, means for rotating said frame, a plurality of applicator elements, each applicator element having an outwardly open cavity shaped to receive at least the upper portion of a tray, means carried by said frame mounting said applicator elements in a series circumferentially about the axis of said frame, means for adjusting said applicator elements radially of said frame to thereby vary the circumferential distance between adjacent applicator elements, means for registering cover sheets with said cavities respectively, means for releasably retaining said sheets against said applicator elements in registry with said cavities, means for moving a series of trays past said applicator in timed relation to the movement of said applicator elements and in position to pass into and out of said cavities respectively, and means for successively releasing the sheet registered with each cavity as the tray moves out of the cavity.

10. An applicator mechanism for registering sheets with a series of objects passing along a predetermined path, said mechanism comprising a frame including a pair of spaced parallel side members and a plurality of cross members extending between and secured to said side members in a circular series, means mounting said frame for rotation, a plurality of applicator elements, means supporting said applicator elements on said cross members for independent radial movement thereon, spring means urging said applicator elements inwardly, and means for independently moving said applicator elements outwardly including a plurality of adjustment bars extending between and projecting laterally beyond said side members, each bar having opposite faces tapered and bearing respectively against a surface on one of said applicator elements and cam surfaces in said side members, whereby shifting movement of said bars laterally of said frame in one direction moves said applicator elements outwardly of said frame and in a reverse direction permits said spring means to move said applicator elements inwardly, and means disposed along the path of movement of the ends of said bars and engageable thereby for adjustably positioning said bars in said frame.

11. An applicator mechanism for registering sheets with a series of objects passing along a predetermined path, said mechanism comprising a frame including a pair of spaced parallel side members and a plurality of cross members extending between and secured to said side members in a circular series, means mounting said frame for rotation, a plurality of applicator elements, means supporting said applicator elements on said cross members for independent radial movement thereon, spring means urging said applicator elements inwardly, and means for independently moving said applicator elements outwardly including a plurality of adjustment bars extending between and projecting laterally from said side members, each bar having opposite faces tapered, and bearing respectively against a surface on one of said applicator elements and cam surfaces in said side members whereby shifting movement of said bars laterally of said frame in one direction moves said applicator elements outwardly of said frame and in a reverse direction permits said spring means to move said applicator elements inwardly, means including a pair of cams disposed respectively in the paths of movement of the ends of said bars and engageable thereby for positioning said bars in said frame, and means for adjusting the positions of said cams relatively to said frame.

12. Apparatus for tucking a flexible cover sheet about a peripheral flange of a rigid tray comprising a conveyor for moving a tray along a predetermined path including a carrier for said tray, a finger pivotally mounted for movement between an active position in the path of movement of the leading flange portion of a tray on said conveyor and an inactive position out of the path of movement of said tray, means normally holding said finger in its inactive position, and actuating means disposed in the path of movement of said conveyor and engageable thereby to move said finger into its active position to tuck a marginal portion of a cover sheet about the leading flange portion of a tray on said carrier and to thereafter return said finger to its inactive position.

13. Apparatus for tucking a flexible cover sheet about a peripheral flange of a rigid tray comprising a conveyor for moving a tray along a predetermined path including a carrier for said tray, a finger pivotally mounted for movement between an active position in the path of movement of the leading flange portion of a tray on said conveyor and an inactive position out of the path of movement of said tray, means normally holding said finger in its inactive position, actuating means disposed in the path of movement of said conveyor and engageable thereby to move said finger into its active position to tuck a marginal portion of a cover sheet about the leading flange portion of a tray on said carrier, and means actuated by movement of said finger through a predetermined extent from its active position toward its inactive position to return said finger to inactive position.

14. Apparatus for tucking flexible cover sheets about peripheral flanges of rigid trays comprising a conveyor for moving trays successively along a predetermined path including a plurality of carriers for said trays, a finger, a shaft pivotally mounting said finger for movement between an active position in the path of movement of the leading flange portion of a tray on said conveyor and an inactive position out of the path of movement of said tray, actuating means disposed in the path of movement of said conveyor and engageable thereby to move said finger into active position for engagement by a tray on said conveyor, a crank on said shaft and a spring connected to said crank and to a fixed point so located that said crank has a dead center position corresponding to a position of said finger in the path of movement of trays on said carriers and intermediate its active and inactive positions, whereby movement of a tray on said conveyor through a predetermined extent while in engagement with said finger effects movement of said crank through dead center position and a return of said finger to inactive position.

15. Apparatus for tucking the marginal edges of a flexible cover sheet around the peripheral flange of a rigid tray comprising a conveyor for moving trays having cover sheets thereon along a predetermined path and a tucker mechanism disposed along the path of movement of the trays and including means for bending the side marginal portion of the cover sheet around the tray side flange, means for folding the side margin portion upwardly under the flange, and means for crimping the side marginal portion against the under side of the side flange.

16. Apparatus for tucking the marginal edges of a flexible cover sheet around the peripheral flange of a rigid tray comprising a conveyor for moving trays having cover sheets thereon along a predetermined path and a tucker mechanism disposed along the path of movement of the trays in position to engage a side flange portion thereof and including a fixed side rail having a groove therein to receive the side flange portion and dimensioned to bend the side marginal portion of the cover sheet around the side flange, means for folding the side marginal portion upwardly under the side flange, and means for crimping the side marginal portion against the under side of the side flange.

17. Apparatus for tucking the marginal edges of a flexible cover sheet around the peripheral flange of a rigid tray comprising a conveyor for moving trays having cover sheets thereon along a predetermined path and a tucker mechanism disposed along the path of movement of the trays in position to engage a side flange portion thereof, and including a means for bending the side marginal portion of the cover sheet around the side flange, a relatively soft, flexible, resilient roller disposed along the path of the side flange in position to be distorted by the side wall of the tray to a shape wherein a portion engages and folds the side marginal portion upwardly under the side flange, and means for crimping the side marginal portion against the under side of the side flange.

18. Apparatus for tucking the marginal edges of a flexible cover sheet around the peripheral flange of a rigid tray comprising a conveyor for moving trays having cover sheets thereon along a predetermined path and a tucker mechanism disposed along the path of movement of the trays in position to engage a side flange portion thereof, and including means for bending the side marginal portion of the cover sheet around the side flange, means for folding the side marginal portion upwardly under the side flange, a flexible resilient roller disposed along the path of the side flange and means for yieldably urging said roller into position to engage and crimp the side marginal portion against the under side of the side flange.

19. A conveyor for articles comprising a pair of flexible endless conveyor elements, means for supporting said conveyor elements for traveling movement along spaced, parallel, closed paths each having a generally horizontal upper flight and a return flight portion connected by arcuate end portions, means for driving said conveyor, a series of article carriers, means for supporting said carriers on said conveyor elements, and means for removing articles from said carriers as the latter are moved from the upper flight toward the lower flight of said conveyor including a blade fixedly supported in inclined position to enter between each carrier and an article thereon to guide the article therefrom.

References Cited in the file of this patent

UNITED STATES PATENTS

| | | |
|---|---|---|
| Re. 18,463 | Goss | May 17, 1923 |
| 1,266,913 | Braecklein | May 21, 1918 |
| 1,428,721 | Towne | Sept. 12, 1922 |
| 1,768,534 | Aiken | July 1, 1930 |
| 2,006,060 | Schilder | June 25, 1935 |
| 2,455,737 | Coyle | Dec. 7, 1948 |
| 2,508,259 | Helme | May 16, 1950 |
| 2,584,925 | Rideout | Feb. 5, 1952 |
| 2,725,000 | O'Neil | Nov. 29, 1955 |
| 2,727,616 | Hensgen | Dec. 20, 1955 |
| 2,727,647 | Luthi | Dec. 20, 1955 |
| 2,779,453 | Lippert | Jan. 29, 1957 |
| 2,830,419 | Annen | Apr. 15, 1958 |